United States Patent
Peng et al.

(10) Patent No.: US 11,678,213 B2
(45) Date of Patent: Jun. 13, 2023

(54) SIGNAL TRANSMISSION METHOD, NETWORK DEVICE, AND SYSTEM

(71) Applicant: Huawei Technologies Co., Ltd., Shenzhen (CN)

(72) Inventors: Wenjie Peng, Shanghai (CN); Kun Yang, Shanghai (CN); Liwei Qiu, Shenzhen (CN); Mingzeng Dai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/131,247

(22) Filed: Dec. 22, 2020

(65) Prior Publication Data

US 2021/0120450 A1    Apr. 22, 2021

Related U.S. Application Data

(63) Continuation of application No. PCT/CN2019/092180, filed on Jun. 21, 2019.

(30) Foreign Application Priority Data

Jun. 22, 2018 (CN) .......................... 201810657293

(51) Int. Cl.
*H04W 28/02* (2009.01)
*H04W 28/22* (2009.01)

(52) U.S. Cl.
CPC ... *H04W 28/0205* (2013.01); *H04W 28/0231* (2013.01); *H04W 28/22* (2013.01)

(58) Field of Classification Search
CPC ......... H04W 28/0205; H04W 28/0231; H04W 28/22; H04W 28/24; H04W 28/18;
(Continued)

(56) References Cited

U.S. PATENT DOCUMENTS 8,213,310 B2    7/2012    Santhanam et al.
8,913,494 B1 *  12/2014   Marupaduga ......... H04W 28/24
                                                         370/329
(Continued)

FOREIGN PATENT DOCUMENTS

CN    101730311 A    6/2010
CN    103491643 A    1/2014
(Continued)

OTHER PUBLICATIONS

"MN and SN role for QoS flow to DRB mapping," 3GPP TSG-RAN WG3 Meeting #97bis, Prague, Czech Republic, R3-173952, Total 14 pages, 3rd Generation Partnership Project, Valbonne, France (Oct. 9-13, 2017).

(Continued)

*Primary Examiner* — Sudesh M Patidar
(74) *Attorney, Agent, or Firm* — Leydig, Voit & Mayer, Ltd.

(57) ABSTRACT

A core network delivers two sets of quality of service (QoS) parameters to an access network device. The access network device selects one of the two sets of QoS parameters, and indicates the selected set of QoS parameters to the core network. An air interface rate required by the set of QoS parameters can be supported by a radio access network (RAN). In this way, a QoS parameter applied to a related user equipment (UE), a related bearer, a related packet data unit (PDU) session, or a related QoS flow can be effectively determined, and a hardware capability of an LTE base station does not need to be upgraded. In addition, the core network may set, based on a QoS parameter selected by a RAN side, a corresponding QoS management policy such as a rate adjustment policy, to facilitate data transmission between UE and the core network.

16 Claims, 14 Drawing Sheets

(58) Field of Classification Search
CPC ............. H04W 28/02; H04W 28/0252; H04W 28/0257; H04W 28/0263; H04W 28/16; H04W 92/10; H04W 92/045; H04W 16/14; H04W 76/12; H04W 76/15; H04W 76/16; H04W 72/08; H04W 72/087; H04L 5/0091; H04L 5/006; H04L 5/0053
See application file for complete search history.

(56) References Cited

U.S. PATENT DOCUMENTS

| | | | |
|---|---|---|---|
| 9,706,521 | B1 | 7/2017 | Oroskar et al. |
| 2002/0093925 | A1 | 7/2002 | Chuah |
| 2008/0107119 | A1* | 5/2008 | Chen ................ H04L 47/15 370/395.21 |
| 2009/0086705 | A1* | 4/2009 | Zisimopoulos ... H04W 72/1268 370/347 |
| 2012/0265898 | A1* | 10/2012 | Kruglick ............... H04W 28/24 709/235 |
| 2014/0128075 | A1 | 5/2014 | Da Silva et al. |
| 2016/0359750 | A1* | 12/2016 | Miklós ................. H04L 5/006 |
| 2017/0142611 | A1* | 5/2017 | Andgart ........... H04W 28/0252 |
| 2019/0029057 | A1* | 1/2019 | Pan ....................... H04W 28/12 |
| 2019/0320476 | A1* | 10/2019 | Wang ..................... H04W 76/11 |
| 2019/0342932 | A1* | 11/2019 | Futaki .................. H04W 76/16 |
| 2020/0015116 | A1* | 1/2020 | Huang ................... H04W 36/00 |
| 2020/0120535 | A1* | 4/2020 | Dai ....................... H04W 76/00 |
| 2020/0280889 | A1* | 9/2020 | Liu ........................ H04W 72/04 |
| 2021/0076351 | A1* | 3/2021 | Gao ................... H04W 68/005 |
| 2021/0144579 | A1* | 5/2021 | Ke ........................ H04W 76/30 |

FOREIGN PATENT DOCUMENTS

| | | |
|---|---|---|
| CN | 104023376 A | 9/2014 |
| CN | 105379351 A | 3/2016 |
| CN | 106416141 A | 2/2017 |
| CN | 107734562 A | 2/2018 |
| CN | 107889255 A | 4/2018 |
| CN | 108024284 A | 5/2018 |
| WO | 2016045702 A1 | 3/2016 |
| WO | 2018062949 A1 | 4/2018 |

OTHER PUBLICATIONS

"3rd Generation Partnership Project; Technical Specification Group Radio Access Network; Evolved Universal Terrestrial Radio Access (E-UTRA) and NR; Multi-connectivity; Stage 2 (Release 15)," 3GPP TS 37.340 V15.2.0, pp. 1-55, 3rd Generation Partnership Project, Valbonne, France (Jun. 2018).

"3rd Generation Partnership Project; Technical Specification Group Radio Access Network; NG-RAN; NG Application Protocol (NGAP) (Release 15)," 3GPP TS 38.413 V1.0.0, pp. 1-265, 3rd Generation Partnership Project, Valbonne, France (Jun. 2018).

"3rd Generation Partnership Project; Technical Specification Group Services and System Aspects; System Architecture for the 5G System; Stage 2 (Release 15)," 3GPP TS 23.501 V15.2.0, pp. 1-217, 3rd Generation Partnership Project, Valbonne, France (Jun. 2018).

"Solution for KI#3: Enhancements for QoS Monitoring and Control," SA WG2 Meeting #127bis, S2-185342 (revision of S2-183738), Newport Beach, CA, USA, pp. 1-2, 3rd Generation Partnership Project, Valbonne, France (May 28-Jun. 1, 2018).

"Flow based QoS framework for E-UTRA connected to 5GC," 3GPP TSG-RAN WG2 Meeting #99, R2-1708400, XP051318264, Total 6 pages, 3rd Generation Partnership Project, Valbonne, France (Aug. 21-25, 2017).

"QoS for eLTE and NR interworking," 3GPP TSG-RAN WG3 #95bis, R3-171011, Spokane, Washington, USA, XP051245736, Total 3 pages, 3rd Generation Partnership Project, Valbonne, France (Apr. 3-7, 2017).

"General aspects of NG interface," 3GPP TSG-RAN WG3 Meeting #96, R3-171704, Hangzhou, China, XP051276486, pp. 1-4, 3rd Generation Partnership Project, Valbonne, France (May 15-19, 2017).

* cited by examiner

SIGNAL TRANSMISSION METHOD, NETWORK DEVICE, AND SYSTEM

CROSS-REFERENCE TO RELATED APPLICATIONS

This application is a continuation of International Application No. PCT/CN2019/092180, filed on Jun. 21, 2019, which claims priority to Chinese Patent Application No. 201810657293.9, filed on Jun. 22, 2018. The disclosures of the aforementioned applications are hereby incorporated by reference in their entireties.

TECHNICAL FIELD

This application relates to the field of wireless communications technologies, and in particular, to a signal transmission method, a network device, and a system.

BACKGROUND

A 5th generation (5G) mobile communications technology is an extension of a 4th generation (4G) mobile communications technology. Therefore, a 5G communications system is referred to as a "beyond 4G network", a "post long term evolution (LTE) system", or a new radio (NR) system.

An existing evolved universal terrestrial radio access network (E-UTRAN) standard supports multi-radio access technology dual connectivity (Multi-RAT Dual Connectivity, MR-DC). In other words, in an RRC_CONNECTED state, user equipment (UE) configured with a plurality of Rxs/Txs may use radio resources scheduled by two base stations. The two base stations are connected to each other by using a non-ideal backhaul interface on an X2 interface. One base station is used as a master base station (master node, MN), and the other base station is used as a secondary base station (secondary node, SN).

In NR, the multi-radio access technology dual connectivity (MR-DC) defines different dual connectivity types, such as E-UTRA-NR dual connectivity (-DC), NGEN-DC (NG-RAN E-UTRA-NR Dual Connectivity), and NE dual connectivity (NR-E-UTRA Dual Connectivity, NE-DC), and defines a plurality of bearer types shown in FIG. 1, namely, an MN terminated MCG bearer, an MN terminated SCG bearer, an MN terminated split bearer, an SN terminated MCG bearer, an SN terminated SCG bearer, and an SN terminated split bearer.

An MCG bearer is a bearer used only for an MCG air interface resource. An SCG bearer is a bearer used only for an SCG air interface resource. A split bearer is a bearer used for both the MCG air interface resource and the SCG air interface resource. "MN terminated" means that a packet data convergence protocol (PDCP) anchor is located in the MN. "SN terminated" means that the PDCP anchor is located in the SN.

For an MR-DC architecture, considering that an NR base station can support a higher air interface rate, the air interface rate supported by the system is increased from original 10 Gbps to 4 Tbps in the standard. In an actual application scenario, a core network determines, according to UE subscription/registration information, an aggregate maximum bit rate (AMBR) applied to the UE or a guaranteed bit rate (GBR) applied to an E-RAB. For example, in an EN-DC architecture, if the UE subscription/registration information indicates that the UE subscribes to an EN-DC service, that is, subscribes to an NR air interface service, the core network delivers a quality of service (QoS) parameter that requires a higher air interface rate to an LTE base station. For example, the AMBR applied to the UE is 4 Tbps. However, an air interface rate supported by the LTE base station cannot reach 4 Tbps, so that a board capability of the LTE base station needs to be upgraded. This brings a great challenge to actual deployment.

SUMMARY

This application provides a signal transmission method, a network device, and a system, so that a QoS parameter applied to a related UE, a related bearer, a related PDU session, or a related QoS flow can be effectively determined, and a board capability of an LTE base station does not need to be upgraded.

According to a first aspect, this application provides a signal transmission method, applied to an access network device side. The method may include: A first access network device receives a first QoS parameter and a second QoS parameter that are sent by a core network device, where an air interface rate required by the first QoS parameter is less than an air interface rate required by the second QoS parameter. The first access network device sends a first indication to the core network device, where the first indication is used to indicate a QoS parameter selected by the first access network device from the first QoS parameter and the second QoS parameter.

For example, when a QoS parameter that requires a high air interface rate cannot be supported by a RAN, a RAN side may select, from two sets of parameters delivered by a core network, the first QoS parameter to be applied to a related UE, a related bearer, a related PDU session, or a related QoS flow; or when a QoS parameter that requires a high air interface rate can be supported by a RAN, a RAN side may select, from two sets of parameters delivered by a core network, the second QoS parameter to be applied to a related UE, a related bearer, a related PDU session, or a related QoS flow.

According to a second aspect, this application provides a signal transmission method, applied to a core network device side. The method may include: A core network device sends a first QoS parameter and a second QoS parameter to a first access network device, where an air interface rate required by the first QoS parameter is less than an air interface rate required by the second QoS parameter. The core network device receives a first indication sent by the first access network device, where the first indication is used to indicate a QoS parameter selected by the first access network device from the first QoS parameter and the second QoS parameter.

According to the methods described in the first aspect and the second aspect, the core network delivers two sets of QoS parameters to an access network device. The access network device selects, from the two sets of QoS parameters, a QoS parameter applied to the related UE, the related bearer, the related PDU session, or the related QoS flow, and indicates the selected QoS parameter to the core network. An air interface rate required by the selected QoS parameter can be supported by a RAN. In this way, the QoS parameter applied to the related UE, the related bearer, the related PDU session, or the related QoS flow can be effectively determined, and a board capability of an LTE base station does not need to be upgraded. In addition, the core network may set, based on a QoS parameter selected by the RAN side, a corresponding QoS management policy such as a rate adjustment policy, to facilitate data transmission between UE and the core network.

In addition, instead of being determined by the core network only based on UE subscription/registration information, the QoS parameter applied to the related UE, the related bearer, the related PDU session, or the related QoS flow is selected by the RAN side and indicated to the core network. Therefore, service flow setup rejection can be avoided when the RAN side cannot support the QoS parameter delivered by the core network, or air interface overload on the RAN side can be avoided. Herein, the service flow setup rejection may include but is not limited to: initial context setup rejection, E-RAB setup rejection, PDU session setup rejection, QoS flow setup rejection, and the like.

In this application, the QoS parameter may include one or more of the following: a user equipment UE level QoS parameter, a bearer level QoS parameter, a data flow level QoS parameter, or a packet data unit PDU session level QoS parameter.

In this application, both the first QoS parameter and the second QoS parameter that are delivered by the core network may include one or both of the following: a guaranteed bit rate GBR or an aggregate maximum bit rate AMBR.

In some optional embodiments, the first QoS parameter and the second QoS parameter may be respectively a mandatory IE and an optional IE in a GBR QoS IE defined in an existing protocol, or may be respectively a mandatory IE and an optional IE in an AMBR QoS IE defined in an existing protocol. Different from the existing protocol, in this application, when there is an optional IE, instead of ignoring an extended AMBR (or GBR) indicated by the mandatory IE, the first access network device stores a basic AMBR (or GBR) indicated by the mandatory IE, and selects an appropriate AMBR (or GBR) from the basic AMBR (or GBR) indicated by the mandatory IE and the extended AMBR (or GBR) indicated by the optional IE.

With reference to the first aspect or the second aspect, in some optional embodiments, the first access network device may select the QoS parameter in, but is not limited to, the following manners.

In a first manner, when an air interface transmission capability of the first access network device supports the air interface rate required by the second QoS parameter, the first access network device may select the second QoS parameter to be applied to the related UE, the related bearer, the related PDU session, or the related QoS flow. That is, the QoS parameter indicated by the first indication is the second QoS parameter. Herein, that an air interface transmission capability of the first access network device supports the air interface rate required by the second QoS parameter may mean that the first access network device is an NR base station, or the LTE base station after hardware upgrade.

In a second manner, when an air interface transmission capability of the first access network device cannot support the air interface rate required by the second QoS parameter, if there are one or more of the following cases, the first access network device may select the first QoS parameter to be applied to the related UE, the related bearer, the related PDU session, or the related QoS flow (that is, the QoS parameter indicated by the first indication is the first QoS parameter).

1. The related UE is not configured with first dual connectivity. The first dual connectivity is associated with the first access network device and a second access network device, and an air interface transmission capability of the second access network device supports the air interface rate required by the second QoS parameter. Herein, that the first dual connectivity is associated with the first access network device and a second access network device means that air interface resources of the first access network device and the second access network device are used for the first dual connectivity.

2. A related EPS bearer/E-RAB is not configured as a first bearer. An access network device in which a PDCP anchor of the first bearer is located supports the air interface rate required by the second QoS parameter. Herein, the access network device in which the PDCP anchor of the first bearer is located may be an NR base station, or the LTE base station after hardware upgrade. Specifically, when the access network device in which the PDCP anchor of the first bearer is located is an SN, the first bearer may be an SN terminated bearer, for example, one or more of an SN terminated MCG bearer, an SN terminated SCG bearer, or an SN terminated split bearer (namely, an SCG split bearer).

3. The related QoS flow is not configured as the first bearer. For descriptions of the first bearer, refer to related content in the foregoing 2. Details are not described herein again.

4. The related PDU session is not configured as the first bearer. For descriptions of the first bearer, refer to related content in the foregoing 2. Details are not described herein again.

That an air interface transmission capability of the first access network device cannot support the air interface rate required by the second QoS parameter may mean that the first access network device is the LTE base station. Herein, that an air interface transmission capability of the second access network device supports the air interface rate required by the second QoS parameter may mean that the first access network device is the NR base station, or that the second access network device is the LTE base station after hardware upgrade.

In a third manner, if there are one or more of the following cases, regardless of an air interface transmission capability of the first access network device, the first access network device may select the second QoS parameter to be applied to the related UE, the related bearer, the related PDU session, or the related QoS flow (that is, the QoS parameter indicated by the first indication is the second QoS parameter).

1. The related UE is configured with first dual connectivity.

2. A related EPS bearer/E-RAB is configured as a first bearer.

3. The related QoS flow is configured as the first bearer.

4. The related PDU session is configured as the first bearer.

With reference to the first aspect or the second aspect, in some optional embodiments, the first QoS parameter and the second QoS parameter may be carried in one or more of the following signaling: a UE context setup request, a UE context modification request, a bearer setup request, a bearer modification request, a PDU session resource setup request, or a PDU session resource modification request. This application is not limited thereto. The first QoS parameter and the second QoS parameter may alternatively be carried in another piece of signaling or newly defined signaling.

With reference to the first aspect or the second aspect, in some optional embodiments, the first indication may be implemented in the following manners.

1. The first indication may be implemented as indication information carried in specific signaling, for example, a bit, a field, or an information element (information element, IE). In this case, the first indication may be referred to as first indication information.

The first indication may be carried in one or more of the following signaling: a UE context setup response, a UE context modification response, a bearer setup response, a bearer modification response, a bearer modification indication, a PDU session resource setup response, a PDU session resource modification response, or a PDU session resource modification indication. This application is not limited thereto. The first indication may alternatively be carried in another piece of signaling or newly defined signaling.

2. The first indication may alternatively be implemented as an independent indication message. In this case, the first indication may be referred to as a first indication message.

In some implementations, the first indication message may include information indicating the first QoS parameter and information indicating the second QoS parameter. If the information indicating the first QoS parameter (or the information indicating the second QoS parameter) has a specific value, it indicates that the QoS parameter selected by the first access network device is the first QoS parameter (or the second QoS parameter).

In some other implementations, when the first indication message includes specific information (for example, a specific bit, a specific field, or a specific IE), it indicates that the QoS parameter selected by the first access network device is the first QoS parameter; or when the first indication message does not include specific information, it indicates that the QoS parameter selected by the first access network device is the second QoS parameter.

In some still other implementations, when the first indication message includes specific information (for example, a specific bit, a specific field, or a specific IE), it indicates that the QoS parameter selected by the first access network device is the second QoS parameter; or when the first indication message does not include specific information, it indicates that the QoS parameter selected by the first access network device is the first QoS parameter.

With reference to the first aspect or the second aspect, in some possible cases, a configuration on the RAN side may change. In this case, the first access network device may reselect a set of QoS parameters from the first QoS parameter and the second QoS parameter based on a changed configuration on the RAN side, and re-send a second indication to the core network, to indicate a reselected QoS parameter to the RAN side.

In some optional embodiments, the first access network device may reselect the QoS parameter in, but is not limited to, the following manners.

In a first manner, if there are but are not limited to one or more of the following cases, the first access network device may reselect the second QoS parameter to be applied to the related UE, the related bearer, the related PDU session, or the related QoS flow.

1. The related UE changes from being not configured with the first dual connectivity to being configured with the first dual connectivity. For the first dual connectivity, refer to related descriptions in the foregoing content. Details are not described herein again.

2. The related EPS bearer/E-RAB changes from being not configured as the first bearer to being configured as the first bearer. For the first bearer, refer to related descriptions in the foregoing content. Details are not described herein again.

3. The related QoS flow changes from being not configured as the first bearer to being configured as the first bearer. For the first bearer, refer to related descriptions in the foregoing content. Details are not described herein again.

4. The related PDU session changes from being not configured as the first bearer to being configured as the first bearer. For the first bearer, refer to related descriptions in the foregoing content. Details are not described herein again.

In a second manner, if there are but are not limited to one or more of the following cases, the first access network device may reselect the first QoS parameter to be applied to the related UE, the related bearer, the related PDU session, or the related QoS flow.

1. The related UE changes from being configured with the first dual connectivity to being not configured with the first dual connectivity. For the first dual connectivity, refer to related descriptions in the foregoing content. Details are not described herein again.

2. The related EPS bearer/E-RAB changes from being configured as the first bearer to being not configured as the first bearer. For the first bearer, refer to related descriptions in the foregoing content. Details are not described herein again.

3. The related QoS flow changes from being configured as the first bearer to being not configured as the first bearer. For the first bearer, refer to related descriptions in the foregoing content. Details are not described herein again.

4. The related PDU session changes from being configured as the first bearer to being not configured as the first bearer. For the first bearer, refer to related descriptions in the foregoing content. Details are not described herein again.

In some optional embodiments, the second indication may be implemented as indication information carried in specific signaling, for example, a bit, a field, or an information element (IE). In this case, the second indication may be referred to as second indication information. Alternatively, the second indication may be implemented as an independent indication message. In this case, the second indication may be referred to as a second indication message.

When the second indication is implemented as the second indication information carried in the specific signaling, the second indication may be carried in one or more of the following signaling: an initial context setup response, a UE context modification response, a UE context modification indication, a bearer setup response, a bearer modification response, an E-RAB modification response, a PDU session resource setup response, a PDU session resource modification response, or a PDU session modification indication. This application is not limited thereto. The second indication may alternatively be carried in another piece of signaling or newly defined signaling.

According to a third aspect, this application provides a signal transmission method, applied to an access network device side. The method may include: A first access network device sends an indication to a core network device, where the indication may be referred to as a third indication, and is used to indicate one or more of the following: whether user equipment is configured with first dual connectivity, or whether a bearer, a QoS flow, or a PDU session is configured as a first bearer. The first access network device receives a QoS parameter sent by the core network device, where the QoS parameter is determined based on the indication.

According to a fourth aspect, this application provides a signal transmission method, applied to a core network device side. The method may include: A core network device receives an indication sent by a first access network device, where the indication may be referred to as a third indication, and is used to indicate one or more of the following: whether user equipment is configured with first dual connectivity, or whether a bearer, a QoS flow, or a PDU session is configured as a first bearer. The core network device sends a QoS parameter to the first access network device, where the QoS parameter is determined based on the indication.

In the third aspect or the fourth aspect, the first dual connectivity is associated with the first access network device and a second access network device, and an air interface transmission capability of the second access network device supports an air interface rate required by a second QoS parameter. An access network device in which a packet data convergence protocol PDCP anchor of the first bearer is located supports the air interface rate required by the second QoS parameter.

With reference to the third aspect or the fourth aspect, in some optional embodiments, the indication is carried in one or more of the following signaling: an initial context setup response, a UE context modification response, a bearer setup response, a bearer modification response, a PDU session resource setup response, or a PDU session resource modification response. This application is not limited thereto. The indication may alternatively be carried in another piece of signaling or newly defined signaling.

According to a fifth aspect, this application provides a signal transmission method, applied to a user equipment side. The method may include: User equipment sends an indication to a core network device, where the indication may be referred to as a fourth indication, and is used to indicate at least one of the following: whether the user equipment is configured with first dual connectivity, or whether a related data flow, a related bearer, or a related PDU session is configured as a first bearer. The indication is used by the core network device to determine a QoS parameter sent to the first access network device.

According to a sixth aspect, this application provides a signal transmission method, applied to a core network device side. The method may include: A core network device receives an indication sent by user equipment, where the indication may be referred to as a fourth indication, and is used to indicate at least one of the following: whether the user equipment is configured with first dual connectivity, or whether a related data flow, a related bearer, or a related PDU session is configured as a first bearer. The indication is used by the core network device to determine a QoS parameter sent to the first access network device.

In the fifth aspect or the sixth aspect, the first dual connectivity is associated with the first access network device and a second access network device, and an air interface transmission capability of the second access network device supports an air interface rate required by a second QoS parameter. An access network device in which a packet data convergence protocol PDCP anchor of the first bearer is located supports the air interface rate required by the second QoS parameter.

With reference to the fifth aspect or the sixth aspect, in some optional embodiments, the indication may be carried in NAS signaling.

According to a seventh aspect, this application provides a network device. The network device includes a plurality of functional units. The plurality of functional units are configured to correspondingly perform the method according to any one of the possible implementations of the first aspect or the third aspect. The network device may be implemented as the first access network device in the first aspect or the third aspect.

According to an eighth aspect, this application provides a network device. The network device includes a plurality of functional units. The plurality of functional units are configured to correspondingly perform the method according to any one of the possible implementations of the second aspect, the fourth aspect, or the sixth aspect. The network device may be implemented as the core network device in the second aspect, the fourth aspect, or the sixth aspect.

According to a ninth aspect, this application provides user equipment. The user equipment includes a plurality of functional units. The plurality of functional units are configured to correspondingly perform the method according to any one of the possible implementations in the fifth aspect.

According to a tenth aspect, this application provides an access network device. The access network device is configured to perform the signal transmission method described in any one of the possible implementations in the first aspect or the third aspect. The access network device may be implemented as the first access network device in the first aspect or the third aspect. The access network device may include: a memory, a processor coupled to the memory, and a transceiver. The transceiver is configured to communicate with another communications device (for example, a core network device or UE). The memory is configured to store code for implementing the signal transmission method described in any one of the possible implementations in the first aspect or the third aspect. The processor is configured to execute program code stored in the memory, to be specific, perform the method according to any one of the possible implementations in the first aspect or the third aspect.

According to an eleventh aspect, this application provides a core network device. The core network device is configured to perform the signal transmission method described in any one of the possible implementations in the second aspect, the fourth aspect, or the sixth aspect. The core network device may include: a memory, a processor coupled to the memory, and a transceiver. The transceiver is configured to communicate with another communications device (for example, an access network device). The memory is configured to store code for implementing the signal transmission method described in any one of the possible implementations in the second aspect, the fourth aspect, or the sixth aspect. The processor is configured to execute program code stored in the memory, to be specific, perform the method according to any one of the possible implementations in the second aspect, the fourth aspect, or the sixth aspect.

According to a twelfth aspect, this application provides user equipment. The user equipment is configured to perform the signal transmission method described in any one of the possible implementations in the fifth aspect. The user equipment may include: a memory, a processor coupled to the memory, and a transceiver. The transceiver is configured to communicate with another communications device (for example, an access network device). The memory is configured to store code for implementing the signal transmission method described in any one of the possible implementations in the fifth aspect. The processor is configured to execute program code stored in the memory, to be specific, perform the method according to any one of the possible implementations in the fifth aspect.

According to a thirteenth aspect, this application provides a communications system. The communications system includes an access network device and a core network device. The access network device may be the access network device described in the seventh aspect or the tenth aspect. The core network device may be the core network device described in the eighth aspect or the eleventh aspect.

According to a fourteenth aspect, this application provides a communications system. The communications system includes user equipment, an access network device, and a core network device. The user equipment may be the user equipment described in the ninth aspect or the twelfth aspect. The access network device may be the access network device described in the seventh aspect or the tenth aspect. The core network device may be the core network device described in the eighth aspect or the eleventh aspect.

According to a fifteenth aspect, this application provides a computer-readable storage medium. The readable storage medium stores an instruction, and when the instruction is run on a computer, the computer is enabled to perform the signal transmission method described in any one of the first aspect to the sixth aspect.

According to a sixteenth aspect, this application provides a computer program product including an instruction. When the computer program product runs on a computer, the computer is enabled to perform the signal transmission method described in any one of the first aspect to the sixth aspect.

BRIEF DESCRIPTION OF DRAWINGS

To describe the technical solutions in the embodiments of this application or in the background more clearly, the following describes the accompanying drawings for describing the embodiments of this application or the background.

DESCRIPTION OF EMBODIMENTS

Terms used in DESCRIPTION OF EMBODIMENTS of this application are only used to explain specific embodiments of this application, and are not intended to limit this application.

Figure 1:
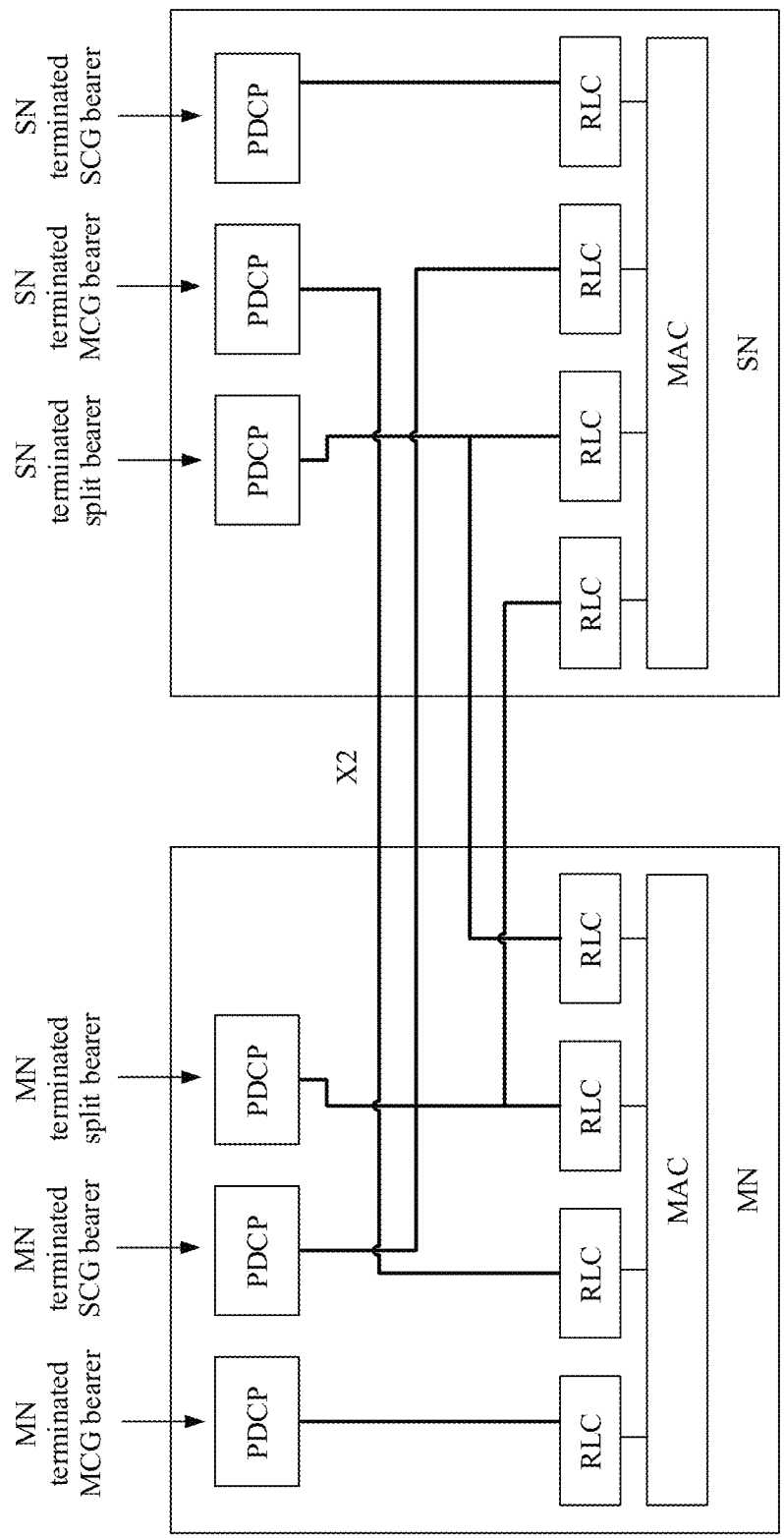
FIG. 1 shows a plurality of bearer types in a DC architecture.
Figure 2:
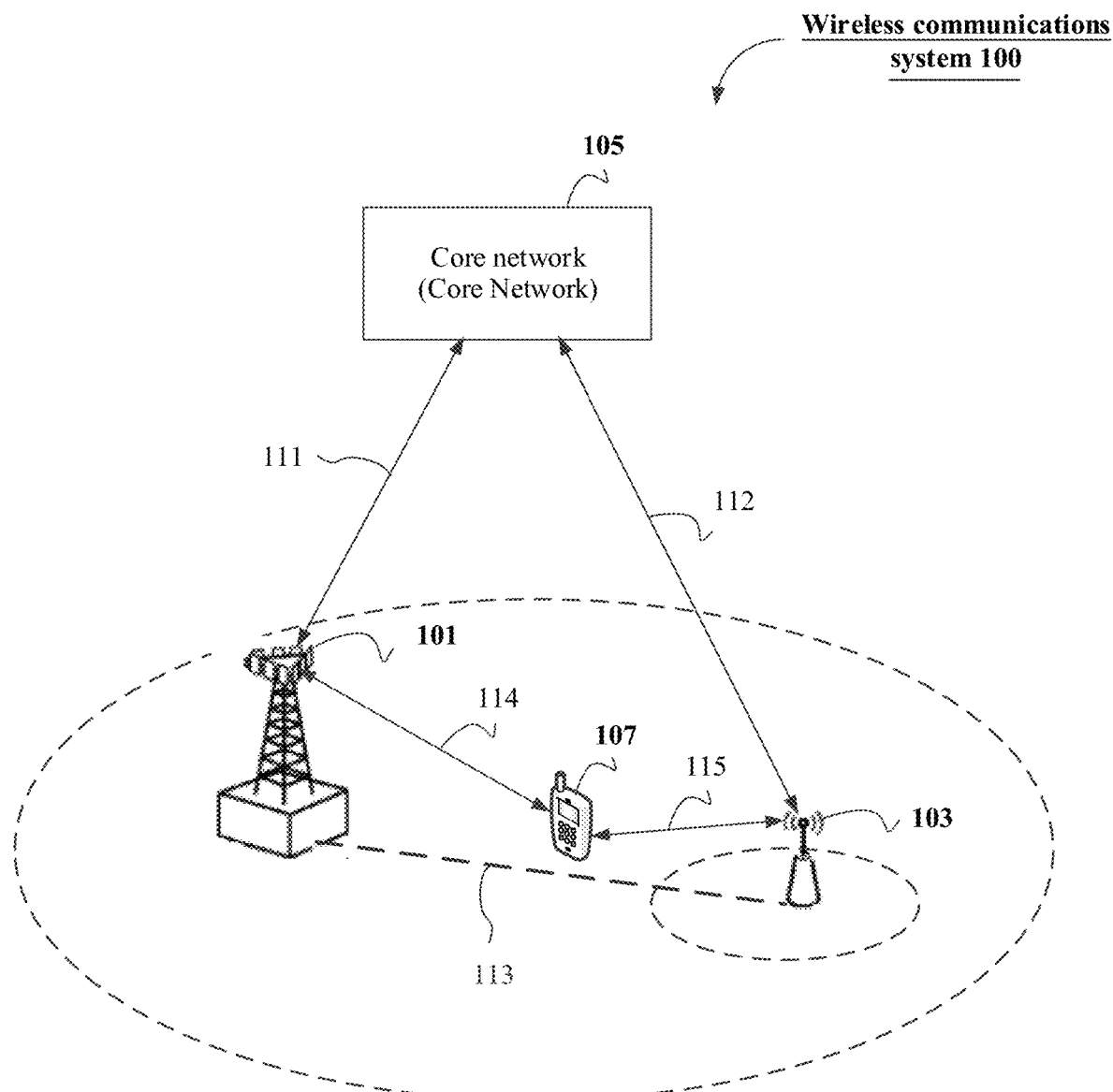
FIG. 2 shows a system architecture of a wireless communications system according to this application.

FIG. 2 shows a wireless communications system according to this application. The wireless communications system may operate in a high frequency band. Not limited to a long term evolution (LTE) system, the wireless communications system may alternatively be a future evolved 5th generation (5G) mobile communications system, a new radio (NR) system, a machine-to-machine (M2M) communications system, or the like. As shown in FIG. 2, the wireless communications system 100 may include a master network node (Master Node, MN) 101, a secondary network node (Secondary Node, SN) 103, one or more terminal devices 107, and a core network 105. The terminal device 107 establishes connections to both the master network node 101 and the secondary network node 103.

The master network node 101 and the secondary network node 103 are access network devices. Specifically, the master network node 101 (or the secondary network node 103) may be a base transceiver station (BTS) in a time division synchronous code division multiple access (TD-SCDMA) system, an evolved NodeB (Evolutional Node B, eNB) in an LTE system, or a gNB in a 5G system or in a new radio (NR) system. In addition, the master network node 101 (or the secondary network node 103) may alternatively be an access point (AP), a transmission node (Trans TRP), a central unit (CU), or another network entity, and may include some or all of functions of the foregoing network entities.

The terminal device 107 may be distributed in the entire wireless communications system 100, and may be static or mobile. In some embodiments of this application, the terminal device 107 may be a mobile device, a mobile station, a mobile unit, an M2M terminal, a radio unit, a remote unit, a user agent, a mobile client, or the like.

A communications interface in the wireless communications system 100 shown in FIG. 2 is implemented as follows:

(1) Communications Interface Between a Network Node and a Core Network

Control information or user data may be transmitted between the master network node 101 and the core network 105 by using a backhaul interface 111 (for example, an S1 interface). User data may be transmitted between the secondary network node 103 and the core network 105 by using a backhaul interface 112 (for example, an S1 interface).

(2) Communications Interface Between a Master Network Node and a Secondary Network Node The master network node 101 and the secondary network node 103 may directly or indirectly communicate with each other by using a non-ideal backhaul interface 113.

(3) Communications Interface Between a Network Node and a Terminal Device

The master network node 101 interacts with the terminal device 107 by using a wireless interface 114, and the secondary network node 103 interacts with the terminal device 107 by using a wireless interface 115. Specifically, the interface 114 and the interface 115 may be Uu interfaces.

The wireless communications system 100 shown in FIG. 2 may use the following several typical MR-DC architectures.

Figure 3A:
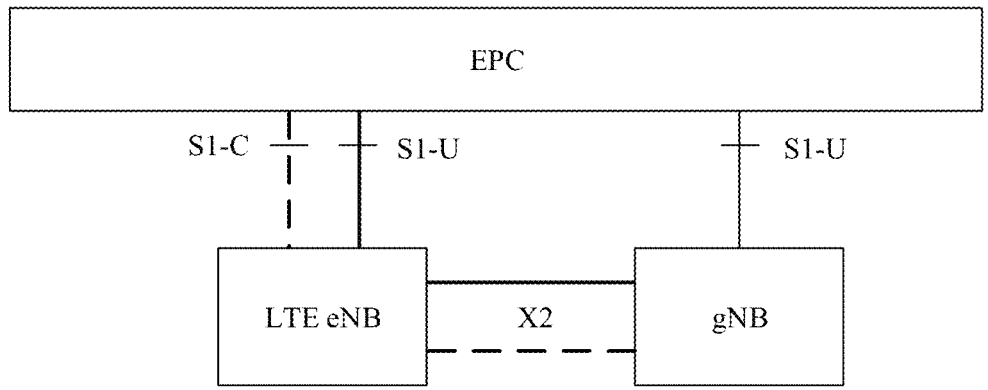
FIG. 3A to FIG. 3C show several typical MR-DC architectures.

(1) EN-DC Architecture Shown in FIG. 3A

As shown in FIG. 3A, in the EN-DC architecture, the core network is an evolved packet core (EPC) network, the master network node 101 is an LTE base station (for example, an eNB), and the secondary network node 103 is an NR base station (for example, a gNB). The core network 105 may include network units such as a mobility management entity (MME) and a service gateway (S-GW). The eNB is connected to the MME by using an S1-C interface. Optionally, the eNB may be further connected to the S-GW by using an S1-U interface. To be specific, the backhaul interface 111 between the master network node 101 and the core network 105 may include a control plane interface S1-C and a data plane interface S1-U. The backhaul interface 112 between the secondary network node 103 and the core network 105 is the data plane interface S1-U. The non-ideal backhaul interface 113 between the master network node 101 and the secondary network node 103 may be an X2 interface.

In the EN-DC architecture shown in FIG. 3A, an LTE eNB may provide an air interface resource for UE through at least one LTE cell, and the at least one LTE cell is referred to as an MCG. An NR gNB may provide an air interface resource for the UE through at least one NR cell, and the at least one NR cell is referred to as an SCG.

Figure 3B:
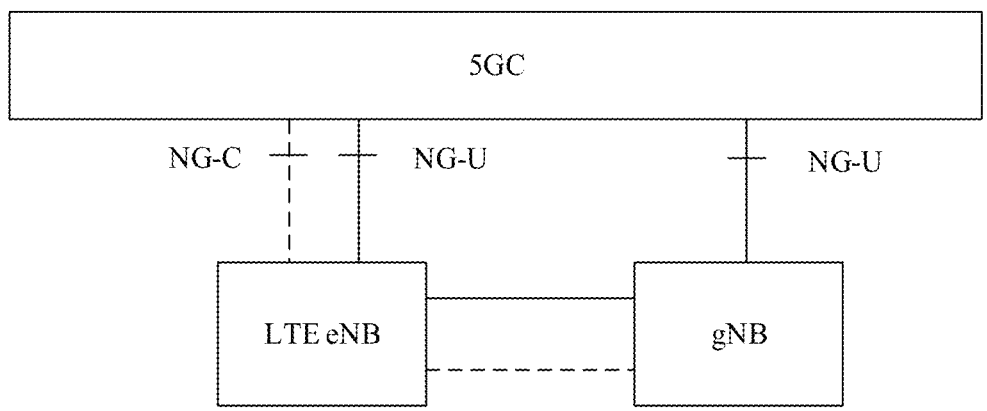

(2) NGEN-DC Architecture Shown in FIG. 3B

As shown in FIG. 3B, in the NGEN-DC architecture, the core network is a 5GC (5G Core), the master network node 101 is an LTE base station (for example, an eNB), and the secondary network node 103 is an NR base station (for example, a gNB). The core network 105 may include network units such as an AMF, a UPF, and an SMF. The eNB is connected to the AMF by using an NG-C interface. Optionally, the eNB may be further connected to the UPF/SMF by using an NG-U interface. To be specific, the backhaul interface 111 between the master network node 101 and the core network 105 may include a control plane interface NG-C, and may optionally include a data plane interface NG-U. The backhaul interface 112 between the secondary network node 103 and the core network 105 may be the data plane interface NG-U. The non-ideal backhaul interface 113 between the master network node 101 and the secondary network node 103 may be an Xn interface.

In the EN-DC architecture shown in FIG. 3B, an LTE eNB may provide an air interface resource for UE through at least one LTE cell, and the at least one LTE cell is referred to as an MCG. An NR gNB may provide an air interface resource for the UE through at least one NR cell, and the at least one NR cell is referred to as an SCG.

Figure 3C:
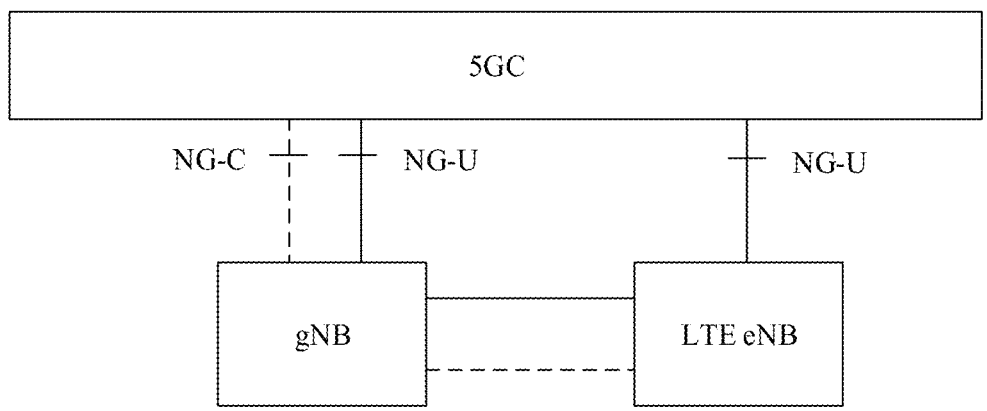

(3) NE-DC Architecture Shown in FIG. 3C

As shown in FIG. 3C, in the NE-DC architecture, the core network is a 5GC (5G Core), the master network node 101 is an NR base station (for example, a gNB), and the secondary network node 103 is an LTE base station (for example, an eNB). The core network 105 may include network units such as an AMF, a UPF, and an SMF. The gNB is connected to the AMF by using an NG-C interface. Optionally, the gNB may be further connected to the UPF/SMF by using an NG-U interface. To be specific, the backhaul interface 111 between the master network node 101 and the core network 105 may include a control plane interface NG-C, and may optionally include a data plane interface NG-U. The backhaul interface 112 between the secondary network node 103 and the core network 105 may be the data plane interface NG-U. The non-ideal backhaul interface 113 between the master network node 101 and the secondary network node 103 may be an Xn interface.

In the NE-DC architecture shown in FIG. 3C, an NR gNB may provide an air interface resource for UE through at least one NR cell, and the at least one NR cell is referred to as an MCG. An LTE eNB may provide an air interface resource for the UE through at least one LTE cell, and the at least one LTE cell is referred to as an SCG.

The wireless communications system 100 shown in FIG. 2 may alternatively use another DC architecture other than the DC architectures shown in FIG. 3A to FIG. 3C, for example, an LTE DC architecture (where both the MN and the SN are LTE base stations, and the core network is the EPC/5GC) or an NR DC architecture (where both the MN and the SN are NR base stations, and the core network is the EPC/5GC).

For the MR-DC architecture, considering that the NR base station can support a higher air interface rate, the air interface rate supported by the system is increased from original 10 Gbps to 4 Tbps in a standard. To solve a problem that an LTE base station terminated bearer needs to support 4 Tbps, a board capability of the LTE base station needs to be upgraded. This brings a great challenge to actual deployment.

To avoid supporting the EN-DC architecture by upgrading hardware of the LTE base station (namely, a main board capability mentioned in the background), an SN terminated split bearer (or referred to as an SCG split bearer) is introduced to the standard.

In the EN-DC architecture, a PDCP anchor of the SCG split bearer is located in the NR base station. Downlink data transmission is used as an example. The NR base station receives data from the core network, and performs data splitting. A portion of data is distributed to the LTE base station, and is sent by the LTE base station to the UE. The other portion of data is sent by the NR base station to the UE. A board capability of the NR base station supports a higher air interface rate, and is high enough by default. Therefore, the SCG split bearer can avoid upgrading the hardware of the LTE base station.

In actual application, the LTE base station in the EN-DC architecture may configure an evolved radio access bearer (E-RAB) that requires a high air interface rate as the SCG split bearer. For example, the following two configuration methods may be used.

Figure 4A:
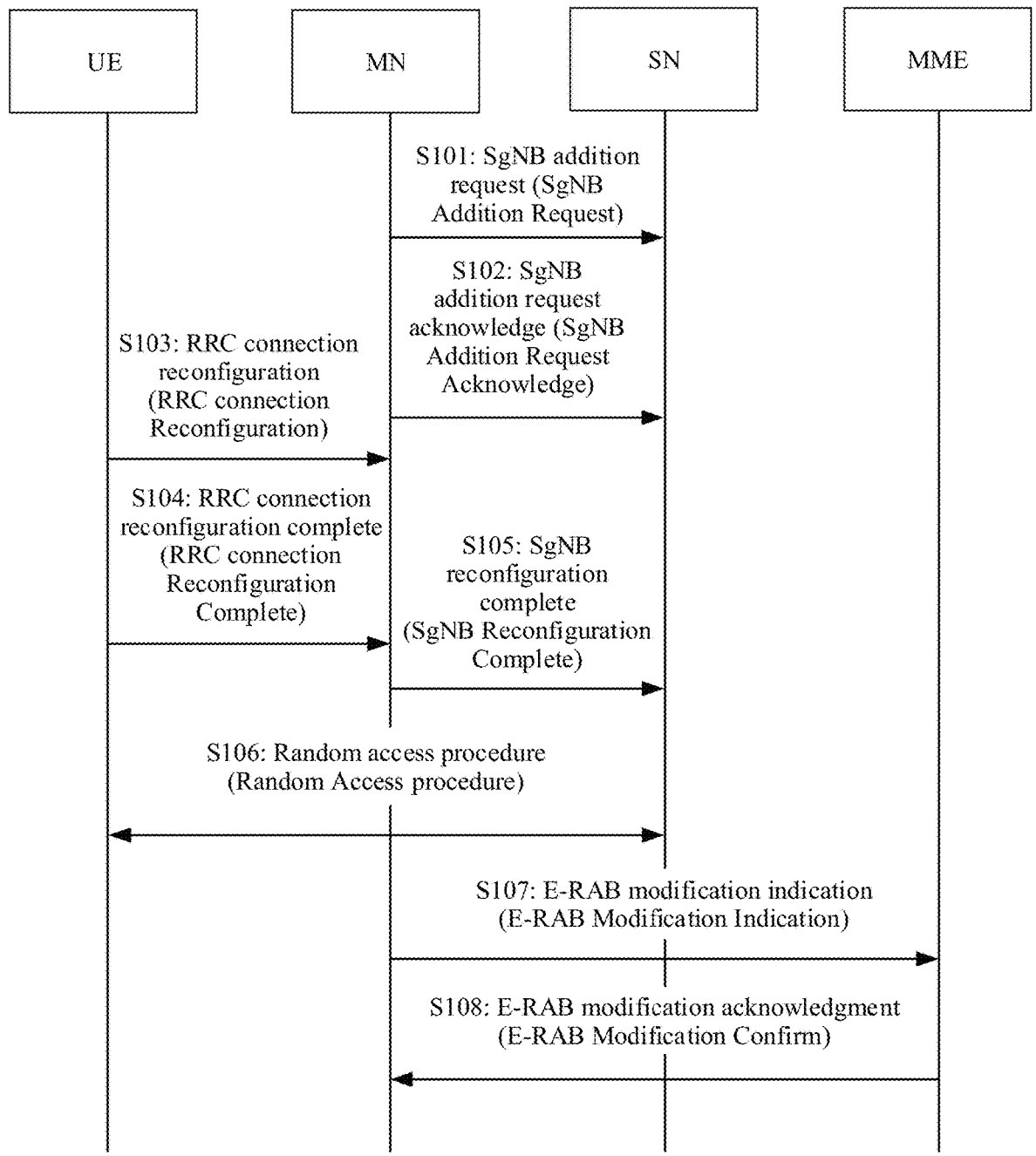
FIG. 4A and FIG. 4B show several procedures in which an E-RAB is configured as an SCG split bearer in this application.

In an implementation, the E-RAB may be initially configured as an MN terminated MCG bearer, and the MN cannot support a high air interface rate required by the E-RAB. As shown in FIG. 4A, after DC is configured for the UE, the LTE base station may modify the E-RAB to another bearer type, for example, the SN terminated split bearer (namely, the SCG split bearer). S101 and S102 show a process in which a master base station adds a secondary base station. S103 and S104 show a process in which the master base station reconfigures the UE. Specifically, the UE configures an air interface configuration of the secondary base station. S105 shows that the master base station notifies the secondary base station that the UE has been successfully configured with the air interface configuration of the secondary base station. S106 shows a process in which the UE accesses the secondary base station. S107 and S108 show a process in which the master base station requests the core network to apply a modification to the E-RAB. The modification may specifically be: the E-RAB is modified from being configured as an MN terminated bearer to being configured as the SCG split bearer. In this way, an air interface rate required by the modified E-RAB can be well supported by the SN (namely, the NR base station).

Figure 4B:
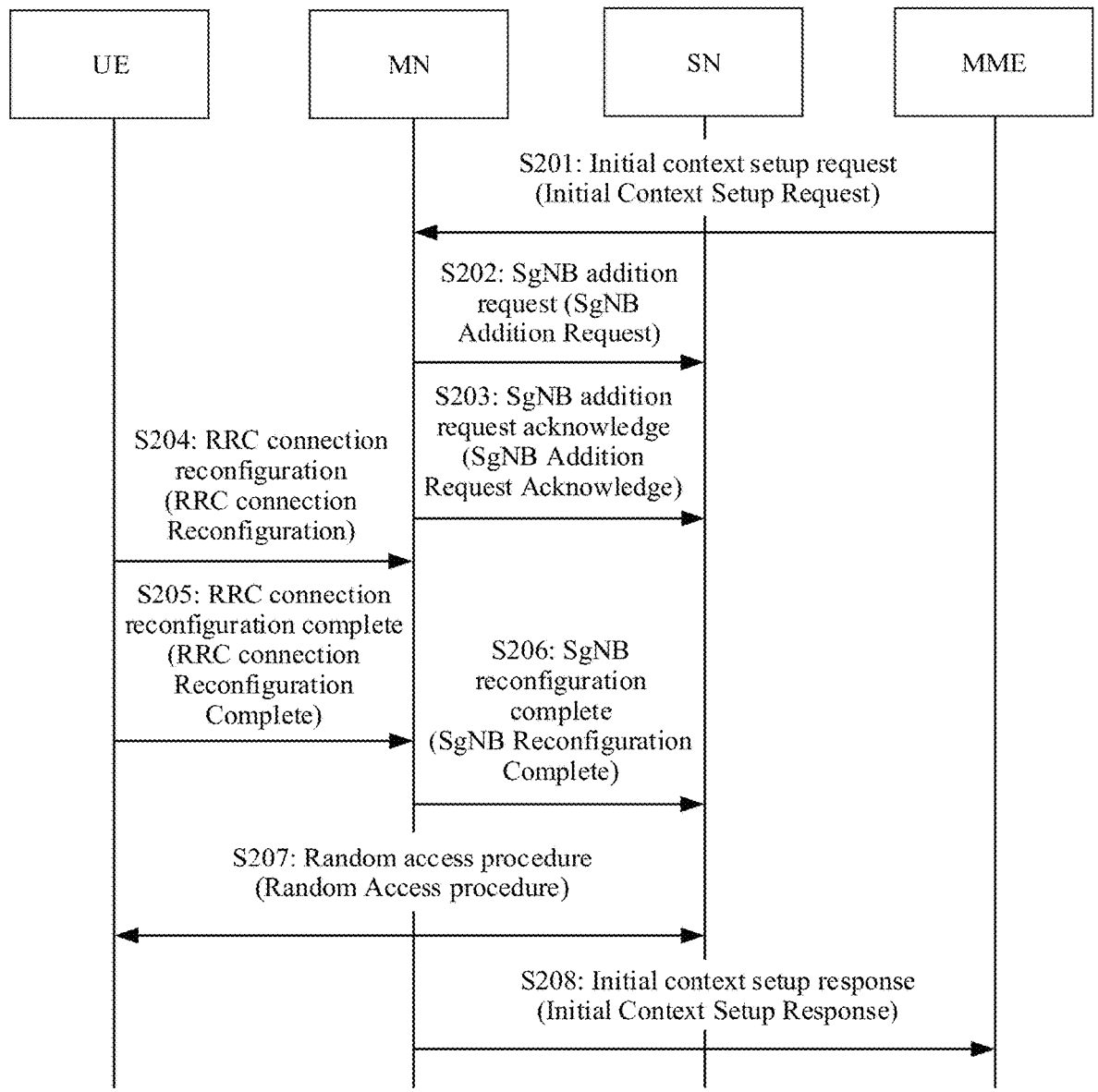

Alternatively, in another implementation, as shown in FIG. 4B, the LTE base station may directly configure the E-RAB as an SN terminated bearer in an initial context setup procedure. S201: The core network initiates the initial context setup procedure, to set up a necessary comprehensive initial UE context. The initial UE context may include an E-RAB context, a security key, a handover restriction list (handover restriction list), a UE air interface capability, a UE security capability, and the like. S202 and S203 show a process in which a master base station adds a secondary base station. S204 and S205 show a process in which the master base station reconfigures the UE. Specifically, the UE configures an air interface configuration of the secondary base station. S206 shows that the master base station notifies the secondary base station that the UE has successfully configured the air interface configuration of the secondary base station. S207 shows a process in which the UE accesses the secondary base station. S208 shows that the MN feeds back an initial context setup result to the core network. In this way, the E-RAB can be directly configured as the SN (namely, the NR base station) terminated bearer, so that an air interface rate required by the E-RAB can be well supported by the SN.

The introduction of the SCG split bearer to the EN-DC architecture can indeed support a higher air interface rate, and avoid a hardware upgrade of the LTE base station. However, the core network does not know a configuration on a RAN side, for example, does not know whether the LTE base station (that is, the MN) supports a high air interface rate, whether the UE is configured with the DC, or whether the E-RAB is configured as the SCG split bearer. In the prior art, the core network determines, according to UE subscription/registration information, a QoS parameter applied to the UE or the E-RAB, and delivers the QoS parameter to the LTE base station. The delivered QoS parameter may be carried in signaling such as an initial context setup request (initial context setup request), a UE context modification request, an E-RAB setup request, or an E-RAB modification request (E-RAB modify request). If the UE subscription/registration information indicates that the UE supports DC used for the NR base station, the core network delivers a QoS parameter that requires a higher air interface rate to the LTE base station. However, in this case, the LTE base station may not perform hardware upgrade, and may not configure the DC for the UE or not configure the E-RAB as the SCG split bearer. In this case, the LTE base station rejects the initial context setup request or the E-RAB setup request. In addition, the LTE base station may feed back a rejection cause to the core network. Optionally, the core network may adjust the delivered QoS parameter based on the rejection cause fed back by the LTE base station, and re-initiate the initial context setup procedure or the E-RAB setup procedure. However, this greatly affects data transmission efficiency.

According to the technical solutions provided in this application, a QoS parameter applied to the UE or a bearer can be effectively determined, and the board capability of the LTE base station does not need to be upgraded. A specific solution is described in detail in subsequent content. Details are not described herein.

It should be noted that the wireless communications system 100 shown in FIG. 2 is merely intended to more clearly describe technical solutions in this application, but is not intended to limit this application. A person of ordinary skill in the art may know that, as a network architecture evolves and a new service scenario emerges, the technical solutions provided in this application are also applicable to a similar technical problem.

According to a signal transmission method provided in this application, the QoS parameter applied to the UE or the bearer can be effectively determined, and the board capability of the LTE base station does not need to be upgraded.

First, basic concepts in this application are described.

(1) QoS Parameter

The QoS parameter may include one or both of a UE level QoS parameter and a bearer level QoS parameter in an EPC architecture. The UE level QoS parameter includes an AMBR, and each UE corresponds to a value of the AMBR. This indicates that a maximum sum of (uplink or downlink) data transmission rates of all non-GBR bearers on the UE may reach the value of the AMBR. The bearer level QoS parameter includes a GBR. The GBR is a minimum (uplink or downlink) bit rate that a system guarantees for a bearer. The minimum bit rate can still be guaranteed even if network resources are insufficient.

Alternatively, the QoS parameter may include one or both of a data flow level QoS parameter and a packet data unit session (PDU session) level QoS parameter in a 5GC architecture. The PDU session level QoS parameter includes an AMBR. This indicates that a maximum sum of (uplink or downlink) data transmission rates of a group of QoS flows may reach a value of the AMBR. The bearer level QoS parameter includes a GBR. The GBR is a minimum (uplink or downlink) bit rate that a system guarantees for a QoS flow. The minimum bit rate can still be guaranteed even if network resources are insufficient.

In an EPC, the UE level QoS parameter (UE AMBR) limits a bit rate of a non-GBR bearer. In a 5GC, the PDU session level QoS parameter (PDU session AMBR) and the UE level QoS parameter (UE AMBR) limit a bit rate of a non-GBR QoS flow. In the EPC, the bearer level QoS parameter (GBR) limits a bit rate of a GBR bearer. In the 5GC, the data flow level QoS parameter (GBR) limits a bit rate of a GBR QoS flow. For the GBR bearer, dedicated network resources are permanently allocated during bearer setup or modification, so that a guaranteed rate can still be used even if the network resources are insufficient. However, unlike the GBR bearer, the non-GBR bearer does not have the guaranteed rate, and a service rate can be reduced when the network resources are insufficient.

(2) Evolved Packet System (EPS) Bearer/Evolved Radio Access Bearer (E-RAB)

Figure 5:
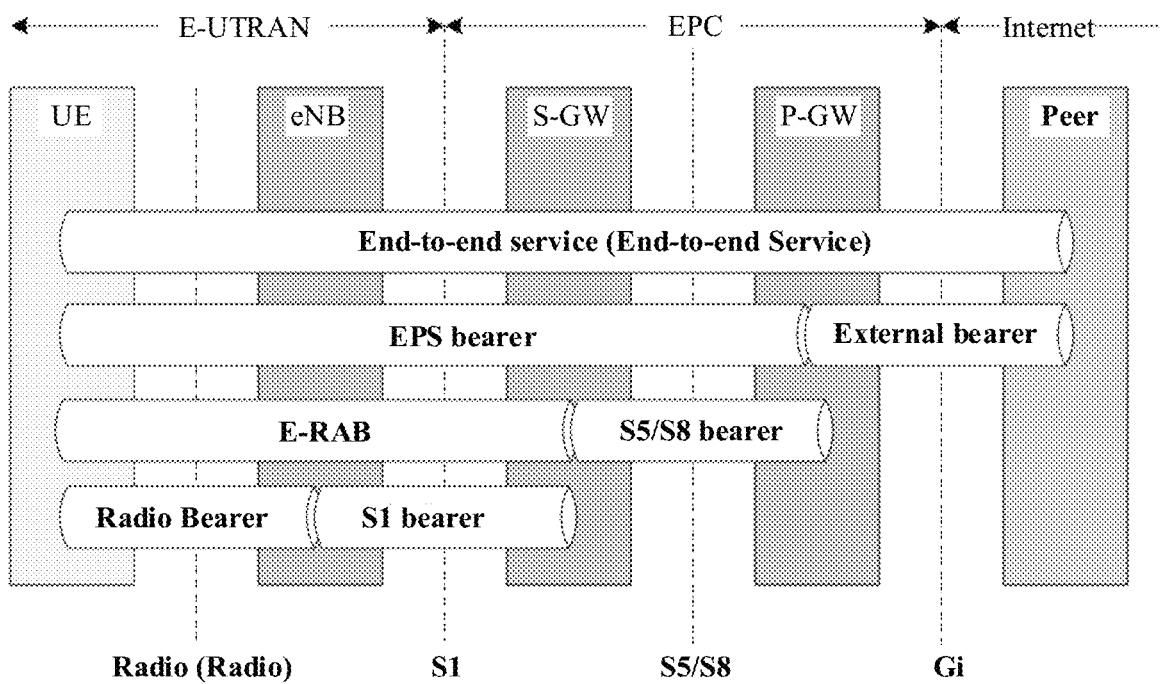
FIG. 5 shows an EPS bearer service architecture according to this application.

In an EPS bearer service architecture shown in FIG. 5, according to different intralayer and interlayer binding relationships, an EPS bearer implements a service connection between a terminal and a PDNGW through concatenation of a radio bearer, an S1 bearer and an S5/S8 bearer.

In an uplink direction, the terminal binds one service data flow to one EPS bearer by using an uplink service flow template. A plurality of service data flows may be multiplexed onto one EPS bearer by using a plurality of packet filters in a service flow template.

In a downlink direction, the PDNGW binds one service data flow to one EPS bearer by using a downlink service flow template. Similarly, a plurality of service data flows may be multiplexed onto one EPS bearer by using a plurality of packet filters in a service flow template.

An E-RAB is used to transmit packets of an EPS bearer between the terminal and the EPC. E-RABs are in a one-to-one correspondence with EPS bearers.

A radio bearer is used to transmit packets of an E-RAB between the terminal and an eNodeB. Radio bearers are in a one-to-one correspondence with E-RABs/EPS bearers.

An S1 bearer is used to transmit packets of an E-RAB between the eNodeB and an S-GW.

An S5/S8 bearer is used to transmit packets of an EPS bearer between the S-GW and the PDNGW.

The terminal stores a mapping relationship between an uplink packet filter and a radio bearer, to form binding between the service data flow and the radio bearer in the uplink direction.

The PDNGW stores a mapping relationship between a downlink packet filter and an S5/S8a bearer, to form binding between the service data flow and the S5/S8a bearer in the downlink direction.

The eNodeB stores a one-to-one mapping relationship between a radio bearer and an S1 bearer, to form binding between the radio bearer and the S1 bearer in the uplink/downlink direction.

The S-GW stores a one-to-one mapping relationship between an S1 bearer and an S5/S8a bearer, to form binding between the S1 bearer and the S5/S8a bearer in the uplink/downlink direction.

For details about the EPS bearer and the E-RAB, refer to 3GPP TS 36.300.

(3) PDU Session and QoS Flow

Figure 6:
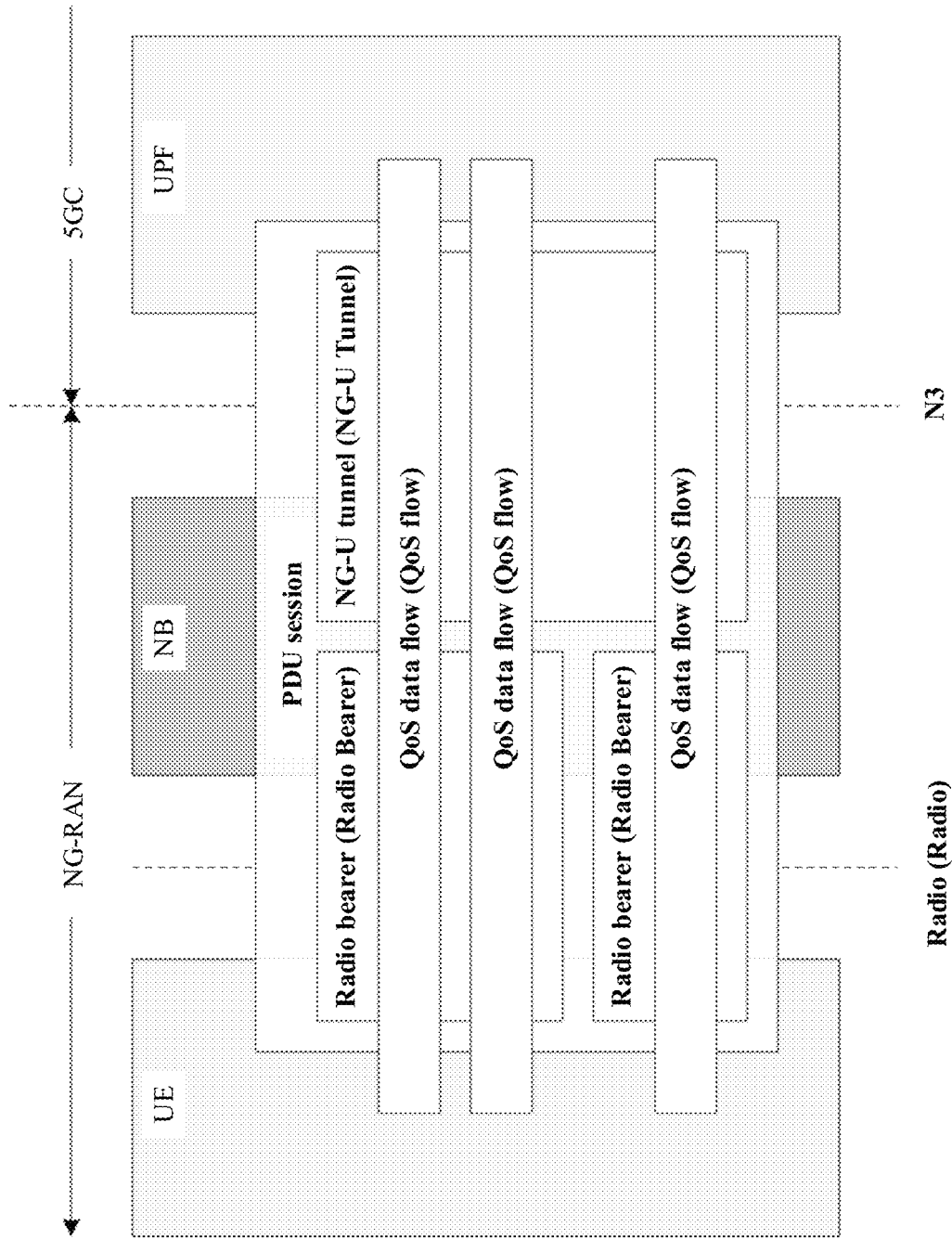
FIG. 6 shows a QoS architecture in a 5GC according to this application.

As shown in FIG. 6, for a QoS architecture in an NG-RAN, a connection between NR and a 5GC and a connection between E-UTRA and a 5GC are described in detail as follows:

For each UE, the 5GC sets up one or more PDU sessions, and each PDU session includes one or more QoS flows.

For each UE, the NG-RAN sets up one or more data radio bearers (data radio bearer, DRB) per PDU session, and each DRB includes one or more QoS flows. Optionally, the NG-RAN may set up at least one default DRB for each PDU session, to transmit data of QoS flows for which no mapping relationship is configured.

An NAS-layer packet filter in the UE and an NAS-layer packet filter in the 5GC associate uplink and downlink data packets with the QoS flows.

A QoS flow is the finest granularity for distinguishing QoS in a PDU session. The QoS flow in the PDU session is identified by using a QoS flow ID (QFI) carried in an encapsulation header transmitted over an NG-U connection.

The 5GC ensures QoS by mapping data packets to appropriate QoS flows, and the NG-RAN ensures QoS by mapping data packets to appropriate DRBs. Therefore, there are two steps of mapping: IP-flows to QoS flows and QoS flows to DRBs.

In a DC architecture, QoS flows belonging to a same PDU session may be mapped to different bearer types. Therefore, two different SDAP entities may be configured for the same PDU session. One of the two SDAP entities corresponds to a master base station, and the other one corresponds to a secondary base station (for example, an MN terminated MCG bearer and an SN terminated SCG bearer are applied to two different QoS flows of the same PDU session).

For details about the PDU session and the QoS flow, refer to 3GPP TS 38.300.

In addition, a main inventive principle of this application may include: A core network delivers two sets of QoS parameters to an access network device. The access network device selects, from the two sets of QoS parameters, a QoS parameter applied to related UE, a related bearer, a related PDU session, or a related QoS flow, and indicates the selected QoS parameter to the core network. An air interface rate required by the selected QoS parameter can be supported by a RAN. In this way, the QoS parameter applied to the related UE, the related bearer, the related PDU session, or the related QoS flow can be effectively determined, and a board capability of an LTE base station does not need to be upgraded. In addition, the core network may set, based on a QoS parameter selected by a RAN side, a corresponding QoS management policy such as a rate adjustment policy, to facilitate data transmission between UE and the core network.

In this application, that an air interface rate required by the selected QoS parameter can be supported by a RAN includes one or more of the following meanings: That the air interface rate required by the QoS parameter applied to the UE can be supported by the RAN means that an access network device with a high air interface transmission capability (for example, an NR base station) is used in data transmission between the UE and the core network. That the air interface rate required by the QoS parameter applied to the bearer/PDU session/QoS flow can be supported by the RAN means that the bearer/PDU session/QoS flow is configured as a bearer terminated on an access network device with a high air interface transmission capability (for example, an NR base station).

In this application, in the two sets of QoS parameters delivered by the core network, one set of QoS parameters requires a relatively low air interface rate, and the other set of QoS parameters requires a relatively high air interface rate. Herein, the set of QoS parameters that requires a relatively low air interface rate may be referred to as a first QoS parameter, and the set of QoS parameters that requires a relatively high air interface rate may be referred to as a second QoS parameter. That is, an air interface rate required by the first QoS parameter is less than an air interface rate required by the second QoS parameter.

Specifically, when the QoS parameter that requires a high air interface rate cannot be supported by the RAN, the RAN side may select, from the two sets of parameters delivered by the core network, the first QoS parameter to be applied to the related UE, the related bearer, the related PDU session, or the related QoS flow; or when the QoS parameter that requires a high air interface rate can be supported by the RAN, the RAN side may select, from the two sets of parameters delivered by the core network, the second QoS parameter to be applied to the related UE, the related bearer, the related PDU session, or the related QoS flow.

In this application, instead of being determined by the core network only based on UE subscription/registration information, the QoS parameter applied to the related UE, the related bearer, the related PDU session, or the related QoS flow is selected by the RAN side and indicated to the core network. Therefore, service flow setup rejection can be avoided when the RAN side cannot support the QoS parameter delivered by the core network, or air interface overload on the RAN side can be avoided. Herein, the service flow setup rejection may include but is not limited to: initial context setup rejection, E-RAB setup rejection, PDU session setup rejection, QoS flow setup rejection, and the like.

In this application, the related UE is UE that performs service flow transmission with the core network. The related bearer is an EPS bearer/E-RAB to which a service flow transmitted between the UE and the core network is mapped. The related PDU session is a PDU session to which a service flow transmitted between the UE and the core network is mapped. The related QoS flow is a QoS flow to which a service flow transmitted between the UE and the core network is mapped.

Figure 7:
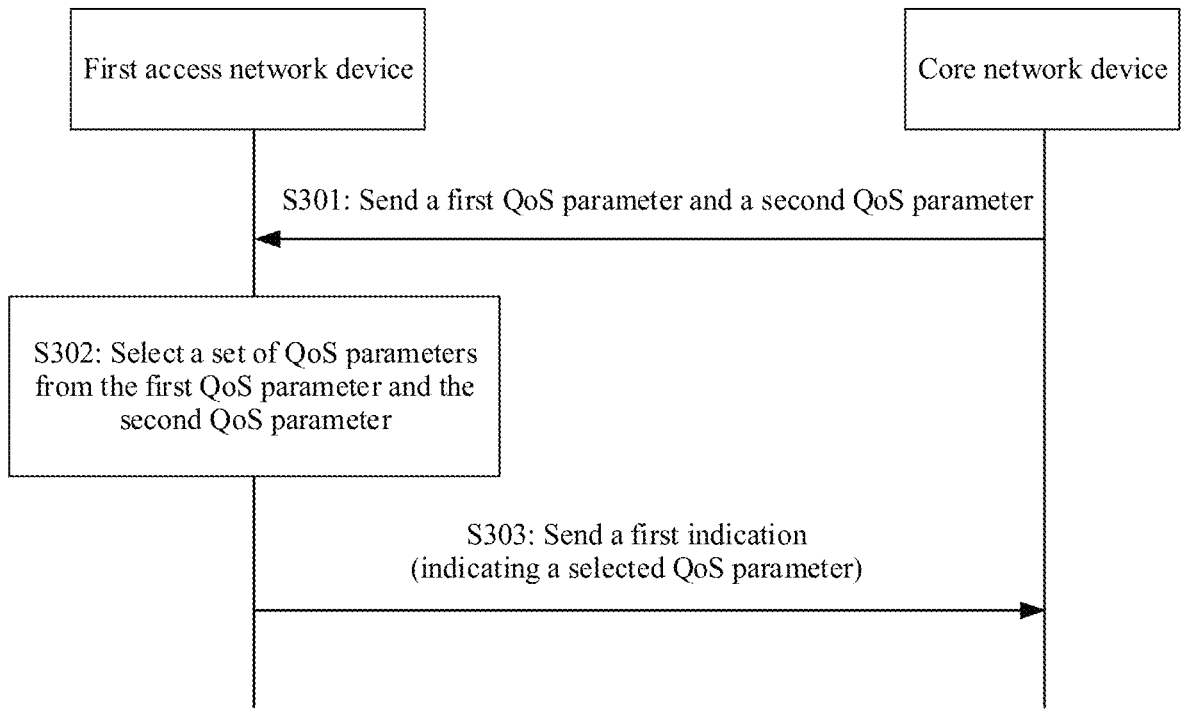
FIG. 7 shows an overall procedure of a signal transmission method according to this application.

Based on the foregoing main inventive principle, the following describes an overall procedure of the signal transmission method provided in this application. As shown in FIG. 7, a signal transmission method provided in this application may include the following steps.

S301: A core network device sends a first QoS parameter and a second QoS parameter to a first access network device. Correspondingly, the first access network device receives the first QoS parameter and the second QoS parameter sent by the core network device. Herein, there is a control plane connection (for example, an S1-C connection or an NG-C connection) between the first access network device and the core network device, and the control plane connection may be a master base station (MN) in a DC architecture.

S302: The first access network device selects a set of QoS parameters from the first QoS parameter and the second QoS parameter.

Specifically, the first access network device may select the QoS parameter in, but is not limited to, the following manners.

In a first manner, when an air interface transmission capability of the first access network device supports an air interface rate required by the second QoS parameter, the first access network device may select the second QoS parameter to be applied to related UE, a related bearer, a related PDU session, or a related QoS flow. Herein, that an air interface transmission capability of the first access network device supports an air interface rate required by the second QoS parameter may mean that the first access network device is an NR base station, or an LTE base station after hardware upgrade.

In a second manner, when an air interface transmission capability of the first access network device cannot support an air interface rate required by the second QoS parameter, if there are one or more of the following cases, the first access network device may select the first QoS parameter to be applied to related UE, a related bearer, a related PDU session, or a related QoS flow.

1. The related UE is not configured with first dual connectivity. The first dual connectivity is associated with the first access network device and a second access network device, and an air interface transmission capability of the second access network device supports the air interface rate required by the second QoS parameter. Herein, that the first dual connectivity is associated with the first access network device and a second access network device means that air interface resources of the first access network device and the second access network device are used for the first dual connectivity.

2. A related EPS bearer/E-RAB is not configured as a first bearer. An access network device in which a PDCP anchor of the first bearer is located supports an air interface rate required by the second QoS parameter. Herein, the access network device in which the PDCP anchor of the first bearer is located may be an NR base station, or an LTE base station after hardware upgrade. Specifically, when the access network device in which the PDCP anchor of the first bearer is located is an SN, the first bearer may be an SN terminated bearer, for example, one or more of an SN terminated MCG bearer, an SN terminated SCG bearer, or an SN terminated split bearer (namely, an SCG split bearer).

3. The related QoS flow is not configured as the first bearer. For descriptions of the first bearer, refer to related content in the foregoing 2. Details are not described herein again.

4. The related PDU session is not configured as the first bearer. For descriptions of the first bearer, refer to related content in the foregoing 2. Details are not described herein again.

That an air interface transmission capability of the first access network device cannot support an air interface rate required by the second QoS parameter may mean that the first access network device is the LTE base station. Herein, that an air interface transmission capability of the second access network device supports the air interface rate required by the second QoS parameter may mean that the first access network device is the NR base station, or that the second access network device is the LTE base station after hardware upgrade.

In a third manner, if there are one or more of the following cases, regardless of an air interface transmission capability of the first access network device, the first access network device may select the second QoS parameter to be applied to related UE, a related bearer, a related PDU session, or a related QoS flow.

1. The related UE is configured with first dual connectivity.

2. A related EPS bearer/E-RAB is configured as a first bearer.

3. The related QoS flow is configured as the first bearer.

4. The related PDU session is configured as the first bearer.

The foregoing several manners in which the first access network device selects the QoS parameter are further described in detail in subsequent embodiments. Details are not described herein.

S303: The first access network device sends an indication to the core network device, where the indication is used to indicate a QoS parameter selected by the first access network device from the first QoS parameter and the second QoS parameter. In this application, the indication may be referred to as a first indication. In this way, a core network can set, based on a QoS parameter selected by a RAN side, a corresponding QoS management policy such as a rate adjustment policy, to facilitate data transmission between the UE and the core network.

In this application, the first QoS parameter and the second QoS parameter may be carried in one or more of the following signaling: a UE context setup request, a UE context modification request, a bearer setup request, a bearer modification request, a PDU session resource setup request, or a PDU session resource modification request. This application is not limited thereto. The first QoS parameter and the second QoS parameter may alternatively be carried in another piece of signaling or newly defined signaling.

In this application, the first indication may be implemented in the following manners.

1. The first indication may be implemented as indication information carried in specific signaling, for example, a bit, a field, or an information element (information element, IE). In this case, the first indication may be referred to as first indication information.

The first indication may be carried in one or more of the following signaling: a UE context setup response, a UE context modification response, a bearer setup response, a bearer modification response, a bearer modification indication, a PDU session resource setup response, a PDU session resource modification response, or a PDU session resource modification indication. This application is not limited thereto. The first indication information may alternatively be carried in another piece of signaling or newly defined signaling.

2. The first indication may alternatively be implemented as an independent indication message. In this case, the first indication may be referred to as a first indication message.

In some implementations, the first indication message may include information indicating the first QoS parameter and information indicating the second QoS parameter. If the information indicating the first QoS parameter (or the information indicating the second QoS parameter) has a specific value, it indicates that the QoS parameter selected by the first access network device is the first QoS parameter (or the second QoS parameter).

In some other implementations, when the first indication message includes specific information (for example, a specific bit, a specific field, or a specific IE), it indicates that the QoS parameter selected by the first access network device is the first QoS parameter; or when the first indication message does not include specific information, it indicates that the QoS parameter selected by the first access network device is the second QoS parameter.

In some still other implementations, when the first indication message includes specific information (for example, a specific bit, a specific field, or a specific IE), it indicates that the QoS parameter selected by the first access network device is the second QoS parameter; or when the first indication message does not include specific information, it indicates that the QoS parameter selected by the first access network device is the first QoS parameter.

In addition, not limited to the NR base station or the LTE base station after hardware upgrade, the access network device that supports the air interface rate required by the second QoS parameter and that is mentioned in this application may alternatively be an NR base station or an LTE base station whose air interface transmission capability reaches a specific degree (for example, an air interface rate with a specific value). The specific degree may be set based on an actual requirement. This is not limited in this application. In other words, not limited to several existing typical MR-DC architectures, the technical solutions provided in this application may alternatively be applied to an NR DC architecture, an LTE DC architecture, and another type of DC architecture in the future. For example, in the NR DC architecture, the specific degree may be higher than 4 Tbps. To be specific, the access network device that supports the air interface rate required by the second QoS parameter may be an enhanced NR base station, and the air interface transmission capability of the access network device is higher than an air interface transmission capability of an existing NR base station. For another example, in the LTE DC architecture, the specific degree may be lower than 10 Gbps. In this case, the air interface rate required by the second QoS parameter may be lower than 10 Gbps, and the air interface rate required by the first QoS parameter is lower. The examples are merely used to explain this application and shall not constitute a limitation.

The following describes in detail, through embodiments, the signal transmission method provided in this application.

(1) Embodiment 1

In an EPC, the QoS parameter may include a bearer level QoS parameter. For example, GBR QoS information exists for a GBR bearer. The GBR QoS information specifically includes a maximum bit rate for downlink, a maximum bit rate for uplink, a guaranteed bit rate for downlink, and a guaranteed bit rate for uplink of the bearer. The QoS parameter may further include a UE level QoS parameter, for example, an AMBR. The AMBR indicates that a maximum sum of data transmission rates of all non-GBR bearers on the UE may reach a value of the AMBR. The uplink and downlink data transmission rates are also differentiated.

1. When the UE level QoS parameter is used, the air interface rate is measured on a per UE basis.

The two sets of QoS parameters delivered by the core network may be two types of AMBRs. One type of AMBR is a basic AMBR, and the other type of AMBR is an extended AMBR. An air interface rate required by the basic AMBR is lower than an air interface rate required by the extended AMBR. In this embodiment, the basic AMBR may be the first QoS parameter, and the extended AMBR may be the second QoS parameter.

Specifically, the basic AMBR is applied to the related UE when the air interface transmission capability of the first access network device does not support the air interface rate required by the second QoS parameter and the related UE is not configured with the first dual connectivity. The extended AMBR is applied to the related UE when the air interface transmission capability of the first access network device supports the air interface rate required by the second QoS parameter and/or the related UE is configured with the first dual connectivity. For the first dual connectivity, refer to related descriptions in the foregoing content. Details are not described herein again. After selecting an AMBR applied to the related UE, the first access network device may send the first indication to the core network, to indicate the selected AMBR applied to the related UE. In this way, the core network can perform QoS management on the related UE based on the AMBR indicated by the first access network device. For example, the core network sets a rate adjustment policy.

Figure 8:
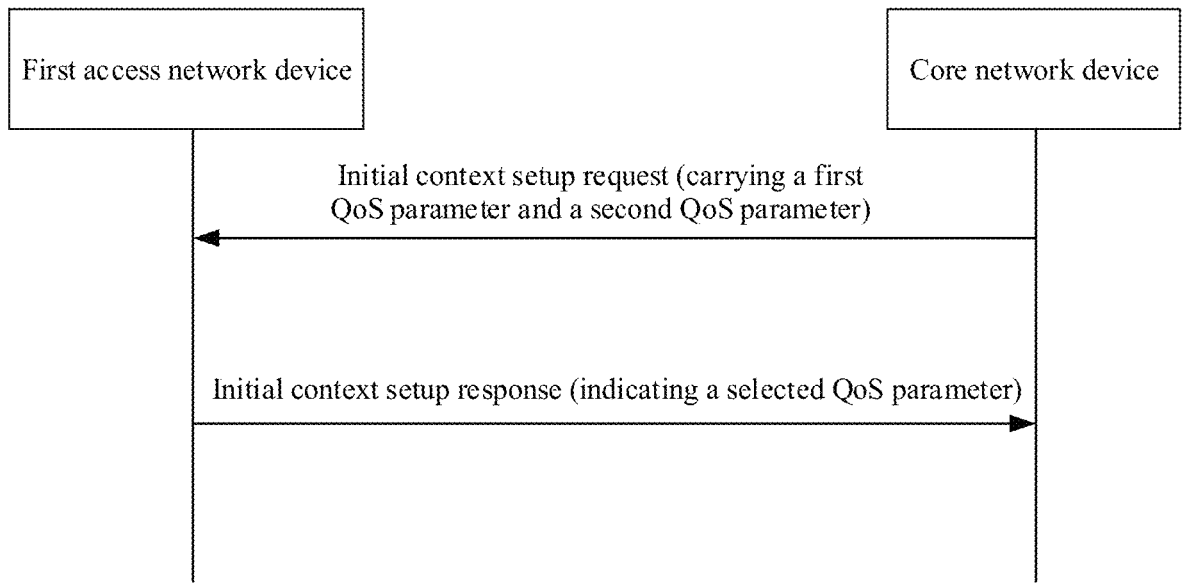
FIG. 8 shows a procedure in which a QoS parameter is interacted between UE and a core network in this application.

As shown in FIG. 8, the UE level QoS parameter may be interacted between the core network and the access network device in an initial context setup procedure (initial context setup procedure). Specifically, the basic AMBR and the extended AMBR may be carried in an initial context setup request. The first access network device may indicate the selected AMBR to the core network by using an initial context setup response. In other words, the AMBR selected by the first access network device may be carried in the initial context setup response.

Figure 9:
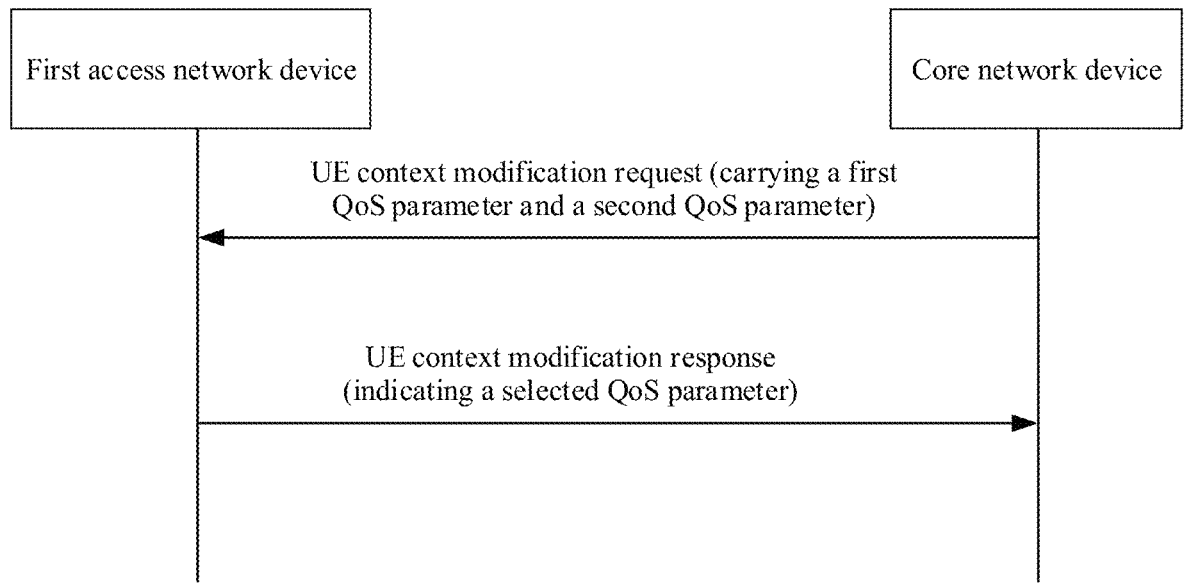
FIG. 9 shows another procedure in which a QoS parameter is interacted between UE and a core network in this application.

As shown in FIG. 9, the UE level QoS parameter may alternatively be interacted between the core network and the access network device in a UE context modification procedure (UE context modification procedure). Specifically, the basic AMBR and the extended AMBR may be carried in a UE context modification request. The first access network device may indicate the selected AMBR to the core network by using the UE context modification response (or referred to as a UE context modification acknowledgment). In other words, the AMBR selected by the first access network device may be carried in the UE context modification response (or referred to as the UE context modification acknowledgment).

Not limited to FIG. 8 and FIG. 9, the UE level QoS parameter may alternatively be interacted between the core network and the access network device in another procedure, for example, a bearer modification indication procedure or a newly defined procedure.

2. When the bearer level QoS parameter is used, the air interface rate is measured on a per bearer basis.

The two sets of QoS parameters delivered by the core network may be two types of GBR QoS information. One type of GBR QoS information is basic GBR QoS information, and the other type of GBR QoS information is extended GBR QoS information. An air interface rate required by the basic GBR QoS information is lower than an air interface rate required by the extended GBR QoS information. In this embodiment, the basic GBR QoS information may be the first QoS parameter, and the extended GBR QoS information may be the second QoS parameter.

Specifically, the basic GBR QoS information is applied to the related bearer when the air interface transmission capability of the first access network device does not support the air interface rate required by the second QoS parameter and the related bearer is not configured as the first bearer. The extended GBR QoS information is applied to the related bearer when the air interface transmission capability of the first access network device supports the air interface rate required by the second QoS parameter and/or the related bearer is configured as the first bearer. For the first bearer, refer to related descriptions in the foregoing content. Details are not described herein again. After selecting GBR QoS information applied to the related bearer, the first access network device may send the first indication to the core network, to indicate a selected GBR applied to the related bearer. In this way, the core network can perform QoS management on the related bearer based on the GBR QoS information indicated by the first access network device. For example, the core network sets a rate adjustment policy.

Similarly, referring to FIG. 8 or FIG. 9, the bearer level QoS parameter may be interacted between the core network and the access network device in an initial context setup procedure or a UE context modification procedure.

Figure 10:
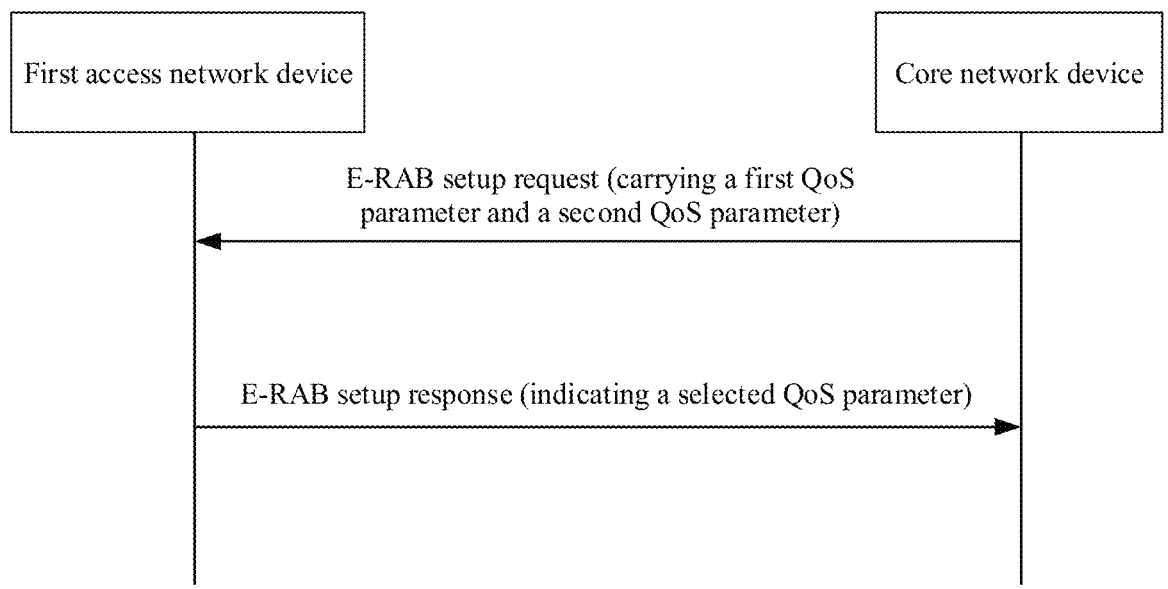
FIG. 10 shows still another procedure in which a QoS parameter is interacted between UE and a core network in this application.

Optionally, as shown in FIG. 10, the bearer level QoS parameter may alternatively be interacted between the core network and the access network device in a bearer setup procedure (for example, an E-RAB setup procedure). Specifically, a basic GBR and an extended GBR may be carried in the bearer setup request. The first access network device may indicate a selected GBR to the core network by using the bearer setup response. In other words, the GBR selected by the first access network device may be carried in the bearer setup response.

Figure 11:
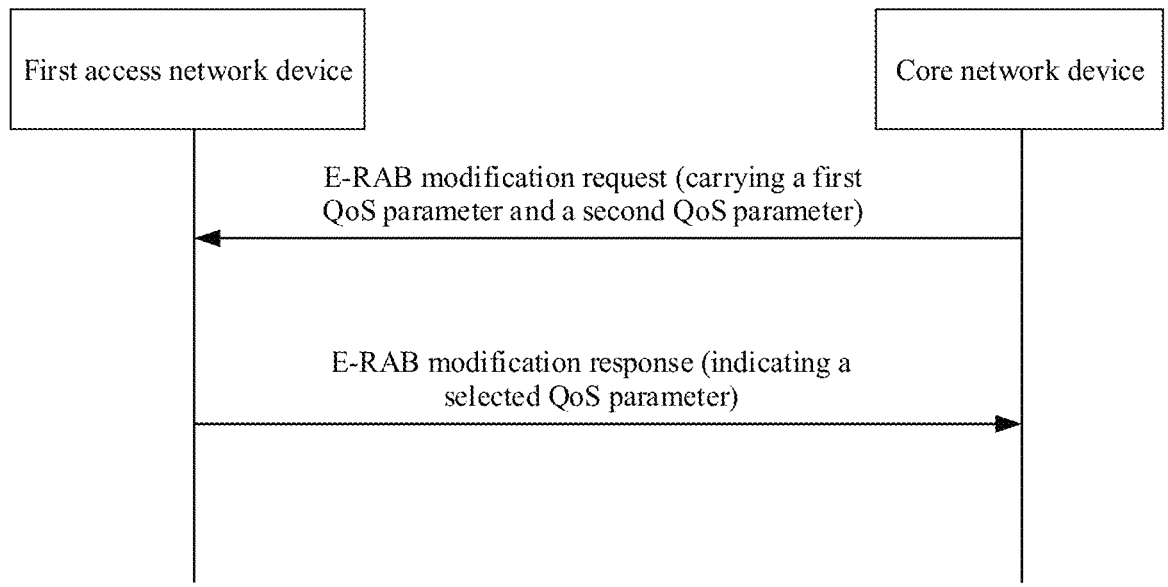
FIG. 11 shows still another procedure in which a QoS parameter is interacted between UE and a core network in this application.

Optionally, as shown in FIG. 11, the bearer level QoS parameter may alternatively be interacted between the core network and the access network device in a bearer modification procedure (for example, an E-RAB modify procedure). Specifically, a basic GBR and an extended GBR may be carried in the bearer modification request. The first access network device may indicate a selected GBR to the core network by using the bearer modification response (or referred to as a bearer modification acknowledgment). In other words, the GBR selected by the first access network device may be carried in the bearer modification response (or referred to as the bearer modification acknowledgment).

Not limited to FIG. 8 to FIG. 11, the bearer level QoS parameter may alternatively be interacted between the core network and the access network device in another procedure, for example, a bearer modification indication procedure or a newly defined procedure.

According to Embodiment 1, an appropriate QoS parameter is selected through interaction between the core network device and the first access network device, so that the access network device can be prevented from rejecting UE context setup/bearer setup when the first access network device cannot meet the air interface rate required by the QoS parameter.

In this embodiment, a GBR QoS information element (information element, IE) defined in an existing protocol may be reused for the basic GBR QoS information and the extended GBR QoS information. The IE indicates the maximum bit rate for downlink, the maximum bit rate for uplink, the guaranteed bit rate for downlink, and the guaranteed bit rate for uplink of the GBR bearer. For details, refer to Table 1.

TABLE 1

| Information element/Group name (IE/Group Name) | Presence (Presence) |
| --- | --- |
| E-RAB maximum bit rate downlink | M |
| E-RAB maximum bit rate uplink | M |
| E-RAB guaranteed bit rate downlink | M |
| E-RAB guaranteed bit rate uplink | M |
| Extended E-RAB maximum bit rate downlink | O |
| Extended E-RAB maximum bit rate uplink | O |
| Extended E-RAB guaranteed bit rate downlink | O |
| Extended E-RAB guaranteed bit rate uplink | O |

"M" indicates mandatory and "O" indicates optional. A mandatory IE may indicate the basic GBR, and an optional IE may indicate the extended GBR. "E-RAB maximum bit rate downlink" indicates the maximum bit rate for downlink, "E-RAB maximum bit rate uplink" indicates the maximum bit rate for uplink, "E-RAB guaranteed bit rate downlink" indicates the guaranteed bit rate for downlink, and "E-RAB guaranteed bit rate uplink" indicates the guaranteed bit rate for uplink. "Extended E-RAB maximum bit rate downlink" indicates an extended maximum bit rate for downlink, "Extended E-RAB maximum bit rate uplink" indicates an extended maximum bit rate for uplink, "Extended E-RAB guaranteed bit rate downlink" indicates an extended guaranteed bit rate for downlink, and "Extended E-RAB guaranteed bit rate uplink" indicates an extended guaranteed bit rate for uplink.

In the GBR QoS information element defined in the existing protocol, an optional IE in Table 1 is introduced to adapt to a high air interface rate of 4 Tbps supported by LTE-NR DC. According to the existing protocol, when there is an optional IE in the GBR QoS information element, an original mandatory IE in the GBR QoS information element are ignored and no longer valid. Different from the existing protocol, in this application, the first access network device stores both basic GBR QoS information indicated by a mandatory IE and extended GBR QoS information indicated by an optional IE, and selects, from the basic GBR QoS information indicated by the mandatory IE and the extended GBR QoS information indicated by the optional IE, the GBR QoS information applied to the related bearer. In other words, in this application, both a mandatory IE and an optional IE in Table 1 are valid.

Similarly, an AMBR QoS IE defined in the existing protocol may be reused for the basic AMBR and the extended AMBR. The IE indicates a maximum bit rate for downlink and a maximum bit rate for uplink of all the non-GBR bearers on the UE. For details, refer to Table 2.

TABLE 2

| Information element/Group name (IE/Group Name) | Presence (Presence) |
| --- | --- |
| UE aggregate maximum bit rate downlink | M |
| UE aggregate maximum bit rate uplink | M |
| Extended UE aggregate maximum bit rate downlink | O |
| Extended UE aggregate maximum bit rate uplink | O |

"M" indicates mandatory and "O" indicates optional. A mandatory IE may indicate the basic AMBR, and an optional IE may indicate the extended AMBR. "UE aggregate maximum bit rate downlink" indicates the maximum bit rate for downlink, and "UE aggregate maximum bit rate uplink" indicates the maximum bit rate for uplink. "Extended UE aggregate maximum bit rate downlink" indicates an extended maximum bit rate for downlink, and "Extended UE aggregate maximum bit rate uplink" indicates an extended maximum bit rate for uplink.

In AMBR QoS information element defined in the existing protocol, an optional IE in Table 2 is introduced to adapt to a high air interface rate of 4 Tbps supported by LTE-NR DC. According to the existing protocol, when there is an optional IE in the AMBR QoS information element, an original mandatory IE in the AMBR QoS information element are ignored and no longer valid. Different from the existing protocol, in this application, the first access network device stores both a basic AMBR indicated by a mandatory IE and an extended AMBR indicated by an optional IE, and selects, from the basic AMBR indicated by the mandatory IE and the extended AMBR indicated by the optional IE, the AMBR applied to the related UE. In other words, in this application, both a mandatory IE and an optional IE in Table 2 are valid.

(2) Embodiment 2

In a 5GC or an NGC, the QoS parameter may include a data flow level QoS parameter, for example, GBR QoS information. The GBR QoS information specifically includes a maximum bit rate for downlink, a maximum bit rate for uplink, a guaranteed bit rate for downlink, and a guaranteed bit rate for uplink of a QoS flow. The QoS parameter may further include a PDU session level QoS parameter, for example, an AMBR. The AMBR indicates that a maximum sum of data transmission rates of non-GBR QoS flows may reach a value of the AMBR. The uplink and downlink data transmission rates are also differentiated.

1. When the PDU session level QoS parameter is used, the air interface rate is measured on a per PDU session basis.

The two sets of QoS parameters delivered by the core network may be two types of AMBRs. One type of AMBR is a basic AMBR, and the other type of AMBR is an extended AMBR. An air interface rate required by the basic AMBR is lower than an air interface rate required by the extended AMBR. In this embodiment, the basic AMBR may be the first QoS parameter, and the extended AMBR may be the second QoS parameter.

Specifically, the basic AMBR is applied to the related PDU session when the air interface transmission capability of the first access network device does not support the air interface rate required by the second QoS parameter and the related PDU session is not configured as the first bearer. The extended AMBR is applied to the related PDU session when the air interface transmission capability of the first access network device supports the air interface rate required by the second QoS parameter and/or the related PDU session is configured as the first bearer. For the first bearer, refer to related descriptions in the foregoing content. Details are not described herein again. After selecting an AMBR applied to the related PDU session, the first access network device may send the first indication to the core network, to indicate the selected AMBR applied to the related PDU session. In this way, the core network can perform QoS management on the related PDU session based on the AMBR indicated by the first access network device. For example, the core network sets a rate adjustment policy.

Figure 12:
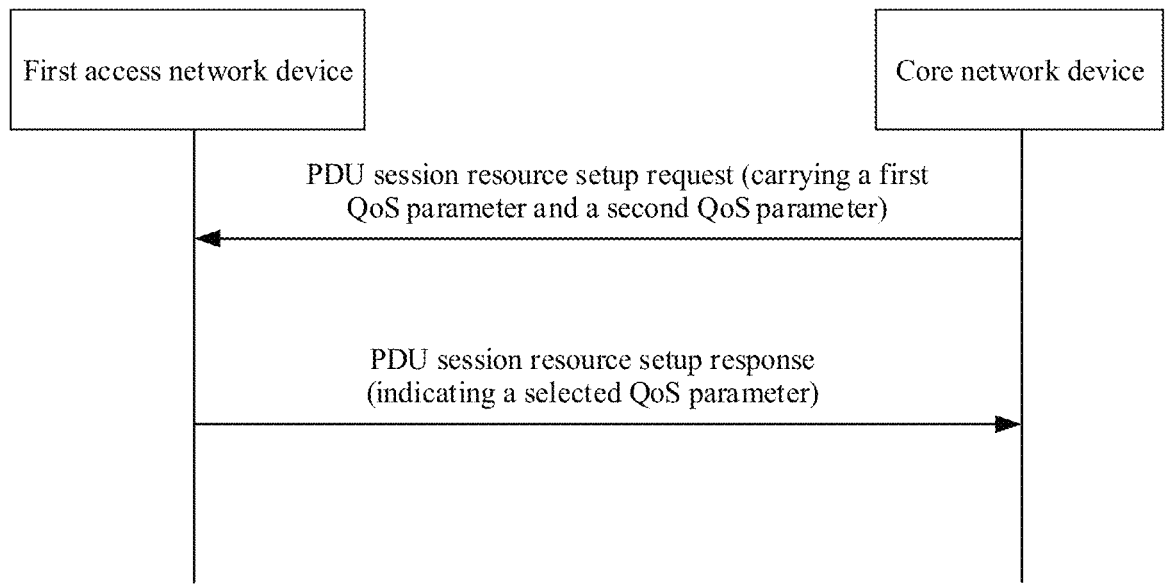
FIG. 12 shows still another procedure in which a QoS parameter is interacted between UE and a core network in this application.

As shown in FIG. 12, the PDU session level QoS parameter may be interacted between the core network and the access network device in a PDU session resource setup procedure. Specifically, the basic AMBR and the extended AMBR may be carried in the PDU session resource setup request. The first access network device may indicate a selected AMBR to the core network by using the PDU session resource setup response. In other words, the AMBR selected by the first access network device may be carried in the PDU session resource setup response.

Figure 13:
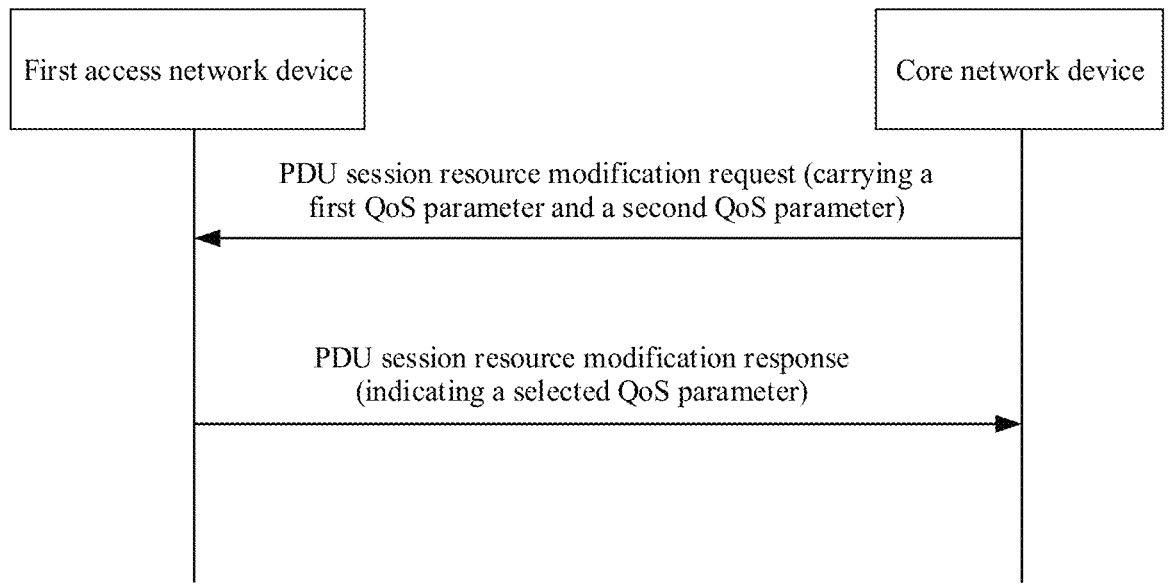
FIG. 13 shows still another procedure in which a QoS parameter is interacted between UE and a core network in this application.

As shown in FIG. 13, the PDU session level QoS parameter may alternatively be interacted between the core network and the access network device in a PDU session resource modification procedure. Specifically, the basic AMBR and the extended AMBR may be carried in the PDU session resource modification request. The first access network device may indicate the selected AMBR to the core network by using the PDU session resource modification response (or referred to as a PDU session resource acknowledgment). In other words, the AMBR selected by the first access network device may be carried in the PDU session resource modification response (or referred to as the PDU session resource acknowledgment).

Not limited to FIG. 12 or FIG. 13, the PDU session level QoS parameter may alternatively be interacted between the core network and the access network device in another procedure, for example, a PDU session modification indication procedure or a newly defined procedure.

2. When the data flow level QoS parameter is used, the air interface rate is measured on a per QoS flow basis.

The two sets of QoS parameters delivered by the core network may be two types of GBRs. One type of GBR QoS information is basic GBR QoS information, and the other type of GBR QoS information is extended GBR QoS information. An air interface rate required by the basic GBR QoS information is lower than an air interface rate required by the extended GBR QoS information. In this embodiment, the basic GBR QoS information may be the first QoS parameter, and the extended GBR QoS information may be the second QoS parameter.

Specifically, the basic GBR QoS information is applied to the related QoS flow when the air interface transmission capability of the first access network device does not support the air interface rate required by the second QoS parameter and the related QoS flow is not configured as the first bearer. The extended GBR QoS information is applied to the related QoS flow when the air interface transmission capability of the first access network device supports the air interface rate required by the second QoS parameter and/or the related QoS flow is configured as the first bearer. For the first bearer, refer to related descriptions in the foregoing content. Details are not described herein again. After selecting GBR QoS information applied to the related QoS flow, the first access network device may send the first indication to the core network, to indicate the selected GBR QoS information applied to the related QoS flow. In this way, the core network can perform QoS management on the related QoS flow based on the GBR QoS information indicated by the first access network device. For example, the core network sets a rate adjustment policy.

Similarly, referring to FIG. 12 or FIG. 13, the data flow level QoS parameter may be interacted between the core network and the access network device in a PDU session resource setup procedure or a PDU session resource modification procedure.

Not limited to FIG. 12 or FIG. 13, the data flow level QoS parameter may alternatively be interacted between the core network and the access network device in another procedure, for example, a PDU session modification indication procedure or a newly defined procedure.

According to Embodiment 2, an appropriate QoS parameter is selected through interaction between the core network device and the first access network device, so that the access network device can be prevented from rejecting PDU session setup when the first access network device cannot meet the air interface rate required by the QoS parameter.

(3) Embodiment 3

Based on Embodiment 1 or Embodiment 2, a configuration on the RAN side may change. For example, the LTE base station adds the NR base station as the SN based on subsequent channel measurement, and configures EN-DC for the UE. The change of the configuration on the RAN side indicates that the UE can support a higher air interface rate, so that a QoS parameter that requires a higher air interface rate may be configured for the UE. For another example, the EN-DC that is initially configured for the UE and that is between the UE and the SN (namely, the NR base station) is released due to reasons such as movement of the UE. The change of the configuration on the RAN side indicates that the UE can support a lower air interface rate, so that a QoS parameter that requires a lower air interface rate needs to be configured for the UE. The examples are merely used to explain this application and shall not constitute a limitation.

In this embodiment, the configuration on the RAN side may include but is not limited to a configuration of the related UE, the related bearer, the related PDU session, or the related QoS flow, for example, whether the UE is configured with the EN-DC, or whether the E-RAB (the PDU session or the QoS flow) is configured as an NR base station terminated bearer.

When the configuration on the RAN side may change, the first access network device may reselect a set of QoS parameters from the first QoS parameter and the second QoS parameter based on a changed configuration on the RAN side, and re-send an indication to the core network, to indicate a reselected QoS parameter to the RAN side. In this application, the resent indication may be referred to as a second indication. For example, in the initial context setup procedure, the first access network device receives the first QoS parameter and the second QoS parameter that are sent by the core network device, and selects only one set of QoS parameters for indicating to the core network. Although not selected, the other set of QoS parameters is still reserved. When the configuration on the RAN side is subsequently changed, the first access network device may need to re-indicate the other set of QoS parameters to the core network. The examples are merely used to explain this application and shall not constitute a limitation.

Specifically, the first access network device may reselect the QoS parameter in, but is not limited to, the following manners.

In a first manner, if there are but are not limited to one or more of the following cases, the first access network device may reselect the second QoS parameter to be applied to the related UE, the related bearer, the related PDU session, or the related QoS flow.

1. The related UE changes from being not configured with the first dual connectivity to being configured with the first dual connectivity. For the first dual connectivity, refer to related descriptions in the foregoing content. Details are not described herein again.

2. The related EPS bearer/E-RAB changes from being not configured as the first bearer to being configured as the first bearer. For the first bearer, refer to related descriptions in the foregoing content. Details are not described herein again.

3. The related QoS flow changes from being not configured as the first bearer to being configured as the first bearer. For the first bearer, refer to related descriptions in the foregoing content. Details are not described herein again.

4. The related PDU session changes from being not configured as the first bearer to being configured as the first bearer. For the first bearer, refer to related descriptions in the foregoing content. Details are not described herein again.

In a second manner, if there are but are not limited to one or more of the following cases, the first access network device may reselect the first QoS parameter to be applied to the related UE, the related bearer, the related PDU session, or the related QoS flow.

1. The related UE changes from being configured with the first dual connectivity to being not configured with the first dual connectivity. For the first dual connectivity, refer to related descriptions in the foregoing content. Details are not described herein again.

2. The related EPS bearer/E-RAB changes from being configured as the first bearer to being not configured as the first bearer. For the first bearer, refer to related descriptions in the foregoing content. Details are not described herein again.

3. The related QoS flow changes from being configured as the first bearer to being not configured as the first bearer. For the first bearer, refer to related descriptions in the foregoing content. Details are not described herein again.

4. The related PDU session changes from being configured as the first bearer to being not configured as the first bearer. For the first bearer, refer to related descriptions in the foregoing content. Details are not described herein again.

For a specific implementation of the second indication, refer to the implementation of the first indication. In other words, the second indication may be implemented as indication information carried in specific signaling, for example, a bit, a field, or an information element (IE). In this case, the second indication may be referred to as second indication information. Alternatively, the second indication may be implemented as an independent indication message. In this case, the second indication may be referred to as a second indication message.

When the second indication is implemented as the second indication information carried in the specific signaling, specific signaling implementation of the second indication may include the following several manners.

Figure 14:
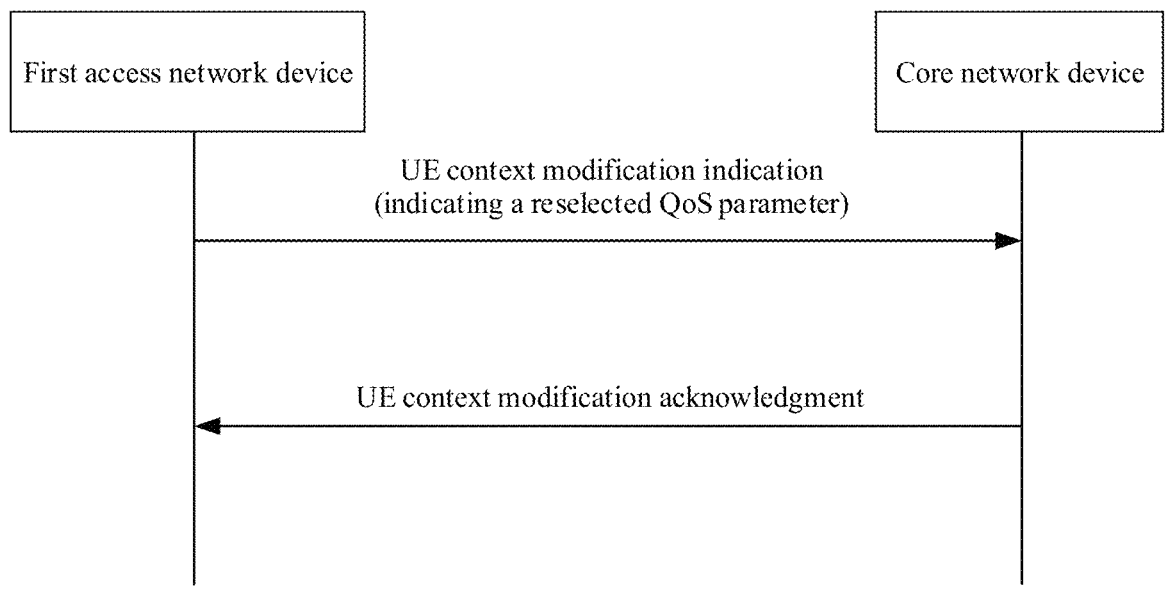
FIG. 14 shows still another procedure in which a QoS parameter is interacted between UE and a core network in this application.

1. The UE level QoS parameter may be re-interacted between the core network and the access network device in an initial context setup procedure or a UE context modification procedure. In other words, the second indication may be carried in an initial context setup response or a UE context modification response. For details, refer to FIG. 8 and FIG. 9. The UE level QoS parameter may alternatively be re-interacted between the core network and the access network device in a UE context modification indication procedure. In other words, the second indication may be carried in a UE context modification indication (UE context modification indication). For details, refer to FIG. 14.

Figure 15:
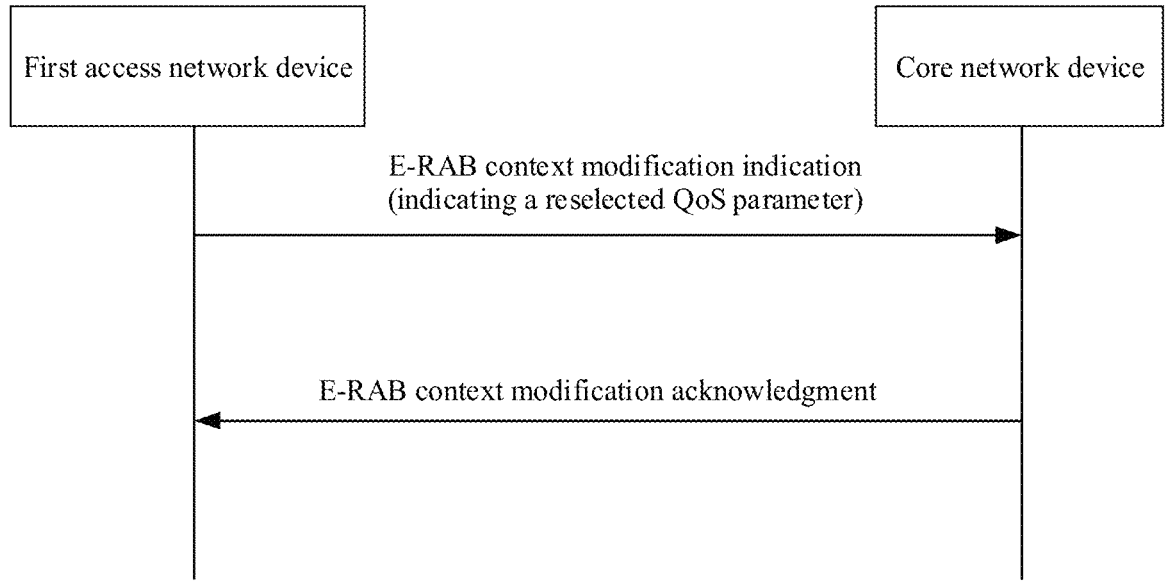
FIG. 15 shows still another procedure in which a QoS parameter is interacted between UE and a core network in this application.

2. The bearer level QoS parameter may also be re-interacted between the core network and the access network device in an initial context setup procedure or a UE context modification procedure. For details, refer to FIG. 8 and FIG. 9. The bearer level QoS parameter may alternatively be re-interacted between the core network and the access network device in a bearer setup procedure (for example, an E-RAB setup procedure) or a bearer modification procedure (for example, an E-RAB modify procedure). In other words, the second indication information may alternatively be carried in a bearer setup response or a bearer modification response. For details, refer to FIG. 10 and FIG. 11. The bearer level QoS parameter may alternatively be re-interacted between the core network and the access network device in a UE context modification indication procedure. In other words, the second indication may be carried in a UE context modification indication. For details, refer to FIG. 14. The bearer level QoS parameter may alternatively be re-interacted between the core network and the access network device in an E-RAB modification indication procedure. In other words, the second indication may be carried in an E-RAB modification indication. For details, refer to FIG. 15.

Figure 16:
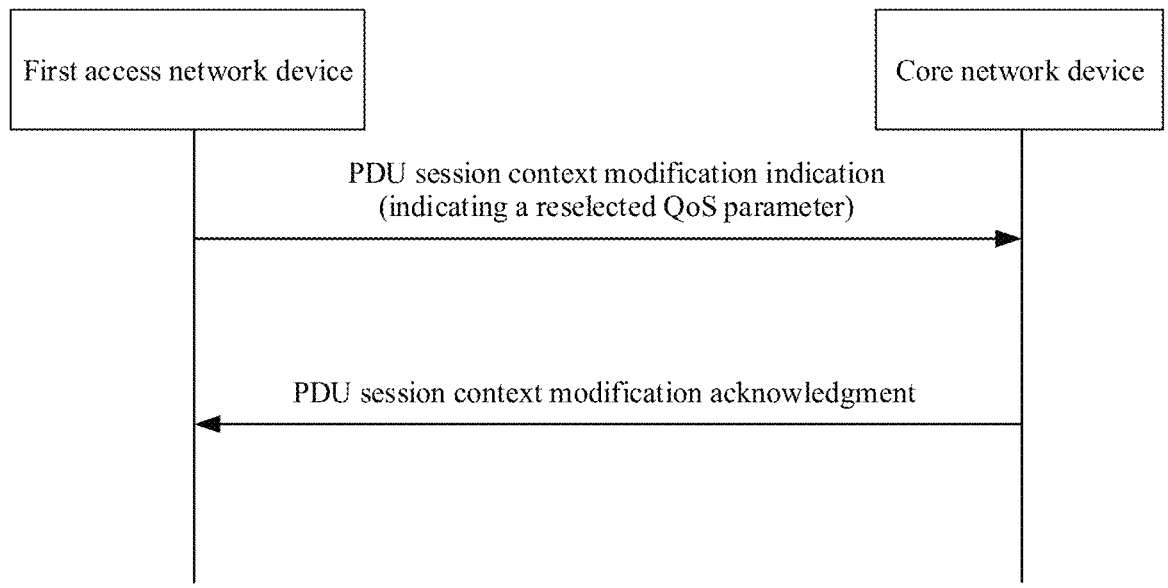
FIG. 16 shows still another procedure in which a QoS parameter is interacted between UE and a core network in this application.

3. The PDU session level QoS parameter may be re-interacted between the core network and the access network device in a PDU session resource setup procedure or a PDU session resource modification procedure. In other words, the second indication may be carried in a PDU session resource setup response or a PDU session resource modification response. For details, refer to FIG. 12 and FIG. 13. The bearer level QoS parameter may alternatively be re-interacted between the core network and the access network device in a PDU session modification indication procedure. In other words, the second indication may be carried in a PDU session modification indication. For details, refer to FIG. 16.

4. The data flow level QoS parameter may also be re-interacted between the core network and the access network device in a PDU session resource setup procedure or a PDU session resource modification procedure. For details, refer to FIG. 12 and FIG. 13. The data flow level QoS parameter may alternatively be re-interacted between the core network and the access network device in a PDU session modification indication procedure. In other words, the second indication may be carried in a PDU session modification indication. For details, refer to FIG. 16.

This application is not limited to the signaling mentioned in the foregoing 1 to 4. The second indication information may alternatively be carried in another piece of signaling or newly defined signaling.

Optionally, the second indication information may be only a change indication, but not a reselected first QoS parameter or a reselected second QoS parameter. In this case, signaling overheads of the second indication information can be reduced.

According to Embodiment 3, when the configuration on the RAN side subsequently changes, the access network device re-indicates the selected QoS parameter to the core network, so that the core network can correspondingly adjust a QoS management policy for the related UE, the related bearer, the related PDU session, or the related QoS flow, to facilitate adaptive adjustment of data transmission between the UE and the core network.

(4) Embodiment 4

Different from the solutions described in the foregoing embodiments, the core network does not deliver the two sets of QoS parameters. The first access network device notifies the core network of a configuration on the RAN side, so that the core network can determine, based on the RAN side, a QoS parameter applied to the related UE, the related bearer, the related PDU session, or the related QoS flow.

For example, the first access network device may send an indication to the core network device, to indicate the configuration on the RAN side. The configuration on the RAN side includes but is not limited to one or more of the following: whether the related UE is configured with the first dual connectivity, whether the related bearer is configured as the first bearer, whether the related PDU session is configured as the first bearer, or whether the related QoS flow is configured as the first bearer. In this application, the indication may be referred to as a third indication. In this way, the core network can determine, based on the third indication, the QoS parameter applied to the related UE, the related bearer, the related PDU session, or the related QoS flow, and deliver the QoS parameter to the first access network device. For the first dual connectivity and the first bearer, refer to related descriptions in the foregoing content. Details are not described herein again.

For a specific implementation of the third indication, refer to the implementation of the first indication. In other words, the third indication may be implemented as indication information carried in specific signaling, for example, a bit, a field, or an information element (IE). In this case, the third indication may be referred to as third indication information. Alternatively, the third indication may be implemented as an independent indication message. In this case, the third indication may be referred to as a third indication message.

When the third indication is implemented as the third indication information carried in the specific signaling, specific signaling implementation of the second indication information may include the following several manners.

1. A configuration of the related UE (for example, whether the UE is configured with the first dual connectivity) may be interacted between the core network and the access network device in an initial context setup procedure or a UE context modification procedure. In other words, the third indication may be carried in an initial context setup response or a UE context modification response. For details, refer to FIG. 8 and FIG. 9.

2. A configuration of the related bearer (for example, whether the E-RAB is configured as the first bearer) may also be interacted between the core network and the access network device in an initial context setup procedure or a UE context modification procedure. For details, refer to FIG. 8 and FIG. 9. The configuration of the related bearer may alternatively be re-interacted between the core network and the access network device in a bearer setup procedure (for example, an E-RAB setup procedure) or a bearer modification procedure (for example, an E-RAB modify procedure). In other words, the third indication information may alternatively be carried in a bearer setup response or a bearer modification response. For details, refer to FIG. 10 and FIG. 11.

3. A configuration of the related PDU session (for example, whether the PDU session is configured as the first bearer) may be interacted between the core network and the access network device in a PDU session resource setup procedure or a PDU session resource modification procedure. In other words, the third indication may be carried in a PDU session resource setup response or a PDU session resource modification response. For details, refer to FIG. 12 and FIG. 13.

4. A configuration of the related QoS flow (for example, whether the QoS flow is configured as the first bearer) may also be re-interacted between the core network and the access network device in a PDU session resource setup procedure or a PDU session resource modification procedure For details, refer to FIG. 12 and FIG. 13.

This application is not limited to the signaling mentioned in the foregoing 1 to 4. The third indication information may alternatively be carried in another piece of signaling or newly defined signaling.

In some possible implementations, after receiving the third indication, the core network may not adjust the QoS parameter applied to the related UE, the related bearer, the related PDU session, or the related QoS flow, but only adaptively adjusts a bit rate for the related UE, the related bearer, the related PDU session, or the related QoS flow.

(5) Embodiment 5

In this embodiment, the core network does not deliver the two sets of QoS parameters. The UE notifies the core network of a configuration on the RAN side, so that the core network can determine, based on the RAN side, a QoS parameter applied to the related UE, the related bearer, the related PDU session, or the related QoS flow.

Specifically, the UE may send an indication to the core network device, to indicate the configuration on the RAN side. In this application, the indication may be referred to as a fourth indication. In this way, the core network can determine, based on the fourth indication, the QoS parameter applied to the related UE, the related bearer, the related PDU session, or the related QoS flow, and deliver the QoS parameter to the first access network device. For the configuration on the RAN side, refer to related descriptions in the foregoing content. Details are not described herein again.

The fourth indication may be implemented as indication information carried in specific signaling (for example, specific non-access stratum (NAS) signaling), for example, a bit, a field, or an information element (IE). In this case, the fourth indication may be referred to as fourth indication information. Alternatively, the fourth indication may be implemented as an independent indication message (for example, NAS signaling). In this case, the fourth indication may be referred to as a fourth indication message.

Content indicated by the fourth indication is the same as content indicated by the third indication in Embodiment 4. For details, refer to related descriptions in Embodiment 4.

In some possible implementations, after receiving the fourth indication information, the core network may not adjust the QoS parameter applied to the related UE, the related bearer, the related PDU session, or the related QoS flow, but only adaptively adjusts a bit rate for the related UE, the related bearer, the related PDU session, or the related QoS flow.

Figure 17:
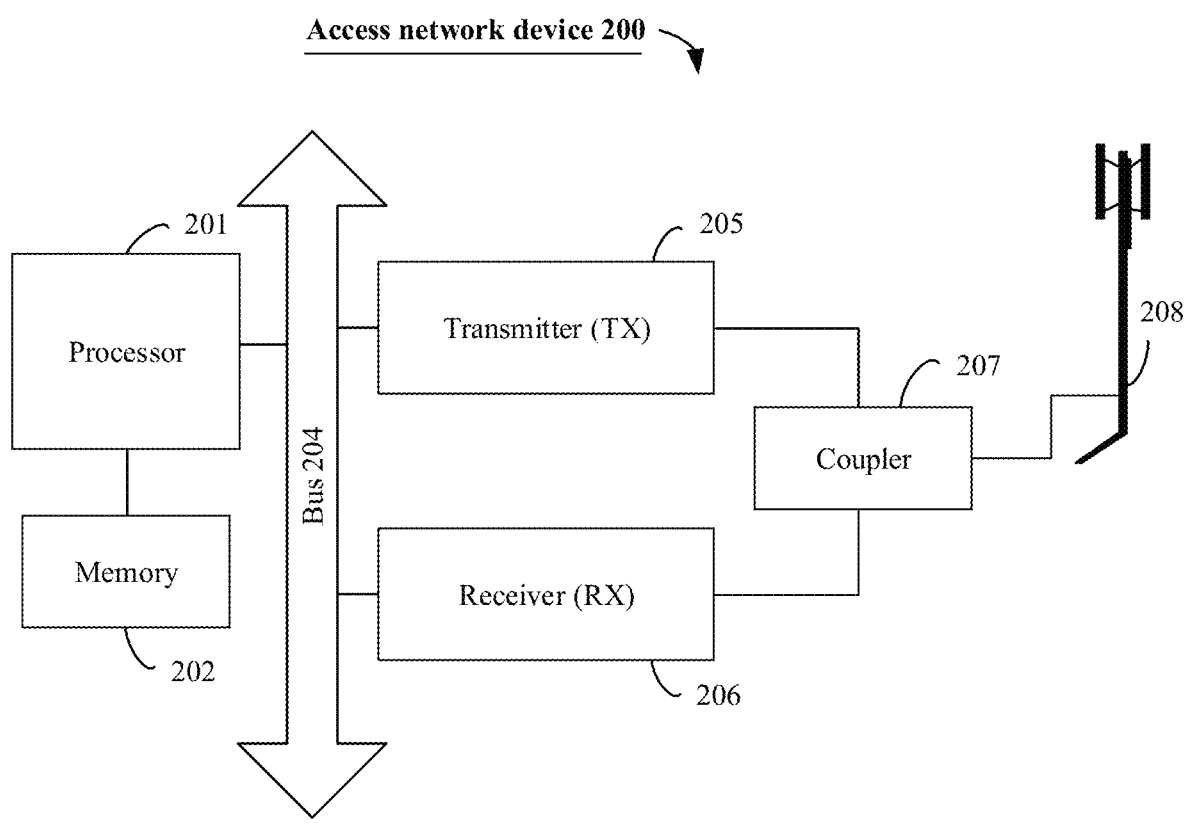
FIG. 17 shows an architecture of an access network device according to this application.

FIG. 17 shows an access network device 200 provided in some embodiments of this application. As shown in FIG. 17, the access network device 200 may include one or more access network device processors 201, a memory 202, a transmitter 205, a receiver 206, a coupler 207, and an antenna 208. These components may be connected by using a bus 204 or in another manner. For example, in FIG. 17, the components are connected by using a bus.

The transmitter 205 may be configured to perform transmission processing, for example, signal modulation, on a signal output by the access network device processor 201. The receiver 206 may be configured to perform reception processing, for example, signal demodulation, on a mobile communications signal received by the antenna 208. In some embodiments of this application, the transmitter 205 and the receiver 206 may be considered as a wireless modem. The access network device 200 may include one or more transmitters 205 and one or more receivers 206. The antenna 208 may be configured to convert electromagnetic energy in a transmission line into an electromagnetic wave in free space, or convert an electromagnetic wave in free space into electromagnetic energy in a transmission line. The coupler 207 may be configured to: divide the mobile communications signal into a plurality of signals, and distribute the plurality of signals to a plurality of receivers 206.

The memory 202 is coupled to the access network device processor 201, and is configured to store various software programs and/or a plurality of sets of instructions. Specifically, the memory 202 may include a high-speed random access memory, and may further include a non-volatile memory, for example, one or more disk storage devices, a flash memory device, or another non-volatile solid-state storage device. The memory 202 may store an operating system (briefly referred to as a system below), for example, an embedded operating system such as uCOS, VxWorks, or RTLinux. The memory 202 may further store a network communications program. The network communications program may be used to communicate with one or more additional devices, one or more terminal devices, or one or more access network devices.

The access network device processor 201 may be configured to: manage a radio channel, establish and disconnect a call and a communications link, provide cell handover control for a user in a local control area, and the like. Specifically, the access network device processor 201 may include an administration/communication module (AM/CM) (a center for speech channel switching and information exchange), a basic module (BM) (configured to implement call processing, signaling processing, radio resource management, radio link management, and circuit maintenance functions), a transcoder and submultiplexer ( ) (configured to implement multiplexing/demultiplexing and transcoding functions), and the like.

In this application, the access network device processor 201 may be configured to read and execute a computer-readable instruction. Specifically, the access network device processor 201 may be configured to: invoke a program stored in the memory 202, for example, a program for implementing, on an access network device 200 side, the signal transmission method provided in one or more embodiments of this application, and execute an instruction included in the program.

It may be understood that the access network device 200 may be the master network node 101 in the wireless communications system 100 shown in FIG. 2, or may be the secondary network node 103 in the wireless communications system 100 shown in FIG. 2. The access network device 200 may be implemented as any one or a combination of a gNB, a new radio eNB, a transmission point (TRP), a macro base station, a micro base station, a high frequency base station, an LTE macro/micro eNB, customer premise equipment (CPE), an access point (AP), a WLAN GO, and the like. For example, the master network node 101 (or the secondary network node 103) may be a gNB. The gNB completes a function of the master network node 101 (or the secondary network node 103) in this application. For another example, the master network node 101 (or the secondary network node 103) may be a combination of a gNB and a TRP. The gNB may complete a resource configuration function of the master network node 101 (or the secondary network node 103), and the TRP completes a transmitting and receiving function of the master network node 101 (or the secondary network node 103). The examples are merely some implementations provided in this application, and should not be construed as a limitation. There may be different implementations in actual application.

It should be noted that the access network device 200 shown in FIG. 17 is merely an implementation of the embodiments provided in this application. In actual application, the access network device 200 may further include more or fewer components. This is not limited herein.

Figure 18:
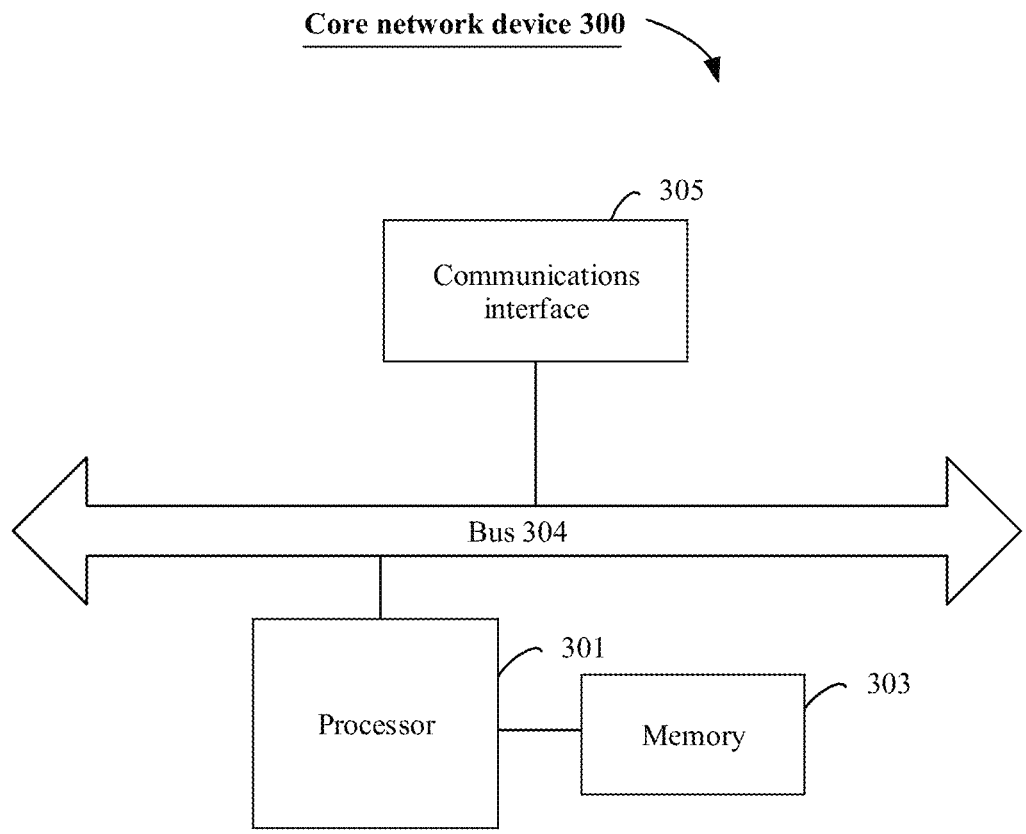
FIG. 18 shows an architecture of a core network device according to this application.

FIG. 18 shows a core network device 300 provided in some embodiments of this application. As shown in FIG. 18, the core network device 300 may include one or more processors 301, a memory 303, and a communications interface 305. These components may be connected by using a bus 304 or in another manner. For example, in FIG. 18, the components are connected by using a bus.

The communications interface 305 may be used for communication between the core network device 300 and another communications device, for example, an access network device. Specifically, the access network device may be the access network device 200 shown in FIG. 17. Specifically, the communications interface 305 may include a wired communications interface such as a wide area network (WAN) interface or a local access network (LAN) interface. This application is not limited to the wired communications interface. In some possible embodiments, the communications interface 305 may alternatively include a wireless communications interface such as a wireless local area network (WLAN) interface.

The memory 303 is coupled to the processor 301, and is configured to store various software programs and/or a plurality of sets of instructions. Specifically, the memory 303 may include a high-speed random access memory, and may further include a non-volatile memory, for example, one or more disk storage devices, a flash memory device, or another non-volatile solid-state storage device. The memory 303 may store an operating system (briefly referred to as a system below), for example, an embedded operating system such as uCOS, VxWorks, or RTLinux. The memory 303 may further store a network communications program. The network communications program may be used to communicate with one or more additional devices, one or more terminal devices, or one or more network devices.

In some embodiments of this application, the memory 303 may be configured to store a program for implementing, on a core network device 300 side, the signal transmission method provided in one or more embodiments of this application. For an implementation of the signal transmission method provided in one or more embodiments of this application, refer to the following embodiments.

The processor 301 may be configured to read and execute a computer-readable instruction. Specifically, the processor 301 may be configured to: invoke a program stored in the memory 305, for example, a program for implementing, on the core network device 300 side, the signal transmission method provided in one or more embodiments of this application, and execute an instruction included in the program.

It may be understood that the core network device 300 may be a core network device in the communications system 100 shown in FIG. 2, and may be implemented as an MME, an S-GW, and a PGW in an EPC, an AMF, an SMF, and a UPF in a 5GC, or the like. The core network device 300 shown in FIG. 18 is merely an implementation of the embodiments of this application. In actual application, the core network device 300 may further include more or fewer components. This is not limited herein.

Figure 19:
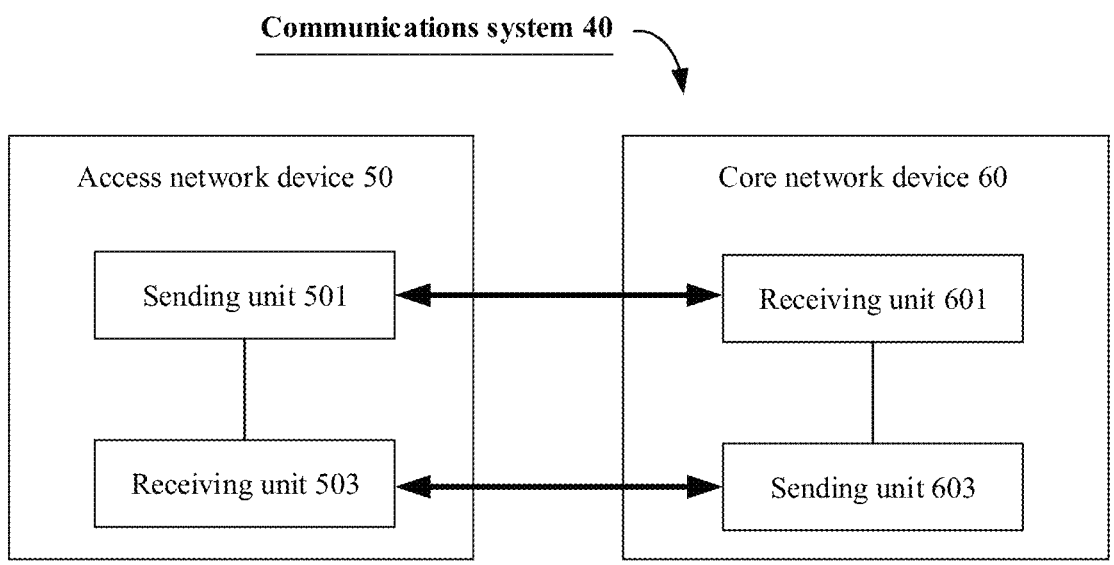
FIG. 19 shows function structures of a wireless communications system and a network device according to this application.

FIG. 19 shows a communications system and a network device according to this application. A communications system 40 may include the following network devices: at least one access network device 50 and at least one core network device 60. The access network device 50 may be the access network device 50 in the foregoing method embodiments, or may be a master base station 101 in the wireless communications system shown in FIG. 2. The access network device 50 may be an LTE base station, an NR base station, or a base station in a future communications system. The communications system 40 and the network devices in the communications system 40 may implement the signal transmission method provided in this application. Details are described below.

As shown in FIG. 19, the core network device 60 may include a sending unit 603 and a receiving unit 601.

The sending unit 603 may be configured to send a first QoS parameter and a second QoS parameter to the access network device 50, where an air interface rate required by the first QoS parameter is less than an air interface rate required by the second QoS parameter.

The receiving unit 601 may be configured to receive a first indication sent by the access network device 50, where the first indication is used to indicate a QoS parameter selected by the access network device 50 from the first QoS parameter and the second QoS parameter.

As shown in FIG. 19, the access network device 50 may include a sending unit 501 and a receiving unit 503.

The receiving unit 503 may be configured to receive a first QoS parameter and a second QoS parameter that are sent by the core network device 60, where an air interface rate required by the first QoS parameter is less than an air interface rate required by the second QoS parameter.

The sending unit 501 may be configured to send a first indication to the core network device 60, where the first indication is used to indicate a QoS parameter selected by the access network device 50 from the first QoS parameter and the second QoS parameter.

The core network device 60 delivers, to the access network device 50, two sets of QoS parameters: the first QoS parameter and the second QoS parameter. The access network device 50 selects one of the two sets of QoS parameters, and indicates the selected set of QoS parameters to the core network device 60. An air interface rate required by the set of QoS parameters can be supported by a related UE, a related bearer, a related PDU session, or a related data flow. In this way, a QoS parameter applied to the related UE, the related bearer, the related PDU session, or the related data flow can be effectively determined, and a board capability of the master base station does not need to be upgraded. In addition, a core network may set, based on a QoS parameter selected by a RAN side, a corresponding QoS management policy such as a rate adjustment policy, to facilitate data transmission between UE and the core network.

For example, the access network device 50 may select the QoS parameter in, but is not limited to, the following manners.

In a first manner, when an air interface transmission capability of the access network device 50 supports the air interface rate required by the second QoS parameter, the access network device 50 may select the second QoS parameter to be applied to the related UE, the related bearer, the related PDU session, or a related QoS flow. Herein, that an air interface transmission capability of the access network device 50 supports the air interface rate required by the second QoS parameter may mean that the access network device 50 is the NR base station, or the LTE base station after hardware upgrade.

In a second manner, when an air interface transmission capability of the access network device 50 cannot support the air interface rate required by the second QoS parameter, if there are one or more of the following cases, the access network device 50 may select the first QoS parameter to be applied to the related UE, the related bearer, the related PDU session, or a related QoS flow.

1. The related UE is not configured with first dual connectivity. The first dual connectivity is associated with the access network device 50 and a second access network device, and an air interface transmission capability of the second access network device supports the air interface rate required by the second QoS parameter. Herein, that the first dual connectivity is associated with the access network device 50 and a second access network device means that air interface resources of the access network device 50 and the second access network device are used for the first dual connectivity.

2. A related EPS bearer/E-RAB is not configured as a first bearer. An access network device in which a PDCP anchor of the first bearer is located supports the air interface rate required by the second QoS parameter. Herein, the access network device in which the PDCP anchor of the first bearer is located may be the NR base station, or the LTE base station after hardware upgrade. When the access network device is an MN, the first bearer may be an MN terminated bearer, for example, one or more of an MN terminated MCG bearer, an MN terminated SCG bearer, or an MN terminated split bearer (namely, an MCG split bearer). When the access network device is an SN, the first bearer may be an SN terminated bearer, for example, one or more of an SN terminated MCG bearer, an SN terminated SCG bearer, or an SN terminated split bearer (namely, an SCG split bearer).

3. The related data flow (for example, a QoS flow) is not configured as the first bearer. For descriptions of the first bearer, refer to related content in the foregoing 2. Details are not described herein again.

4. The related PDU session is not configured as the first bearer. For descriptions of the first bearer, refer to related content in the foregoing 2. Details are not described herein again.

That an air interface transmission capability of the access network device 50 cannot support the air interface rate required by the second QoS parameter may mean that the access network device 50 is the LTE base station. Herein, that an air interface transmission capability of the second access network device supports the air interface rate required by the second QoS parameter may mean that the access network device 50 is the NR base station, or that the second access network device is the LTE base station after hardware upgrade.

In a third manner, if there are one or more of the following cases, regardless of an air interface transmission capability of the access network device 50, the access network device 50 may select the second QoS parameter to be applied to the related UE, the related bearer, the related PDU session, or a related QoS flow.

1. The related UE is configured with first dual connectivity.

2. A related EPS bearer/E-RAB is not configured as a first bearer.

3. The related data flow (for example, a QoS flow) is not configured as the first bearer.

4. The related PDU session is not configured as the first bearer.

In this application, the first QoS parameter and the second QoS parameter may be carried in one or more of the following signaling: a UE context setup request, a UE context modification request, a bearer setup request, a bearer modification request, a PDU session resource setup request, or a PDU session resource modification request. This application is not limited thereto. The first QoS parameter and the second QoS parameter may alternatively be carried in another piece of signaling or newly defined signaling.

In this application, the first indication may be implemented as indication information carried in specific signaling, for example, a bit, a field, or an information element (information element, IE). In this case, the first indication may be referred to as first indication information. The first indication may be carried in one or more of the following signaling: a UE context setup response, a UE context modification response, a bearer setup response, a bearer modification response, a bearer modification indication, a PDU session resource setup response, a PDU session resource modification response, or a PDU session resource modification indication. This application is not limited thereto. The first indication information may alternatively be carried in another piece of signaling or newly defined signaling.

In this application, the first indication may alternatively be implemented as an independent indication message. In this case, the first indication may be referred to as a first indication message. In some implementations, the first indication message may include information indicating the first QoS parameter and information indicating the second QoS parameter. If the information indicating the first QoS parameter (or the information indicating the second QoS parameter) has a specific value, it indicates that the QoS parameter selected by a first access network device is the first QoS parameter (or the second QoS parameter). In some other implementations, when the first indication message includes specific information (for example, a specific bit, a specific field, or a specific IE), it indicates that the QoS parameter selected by a first access network device is the first QoS parameter; or when the first indication message does not include specific information, it indicates that the QoS parameter selected by a first access network device is the second QoS parameter. In some still other implementations, when the first indication message includes specific information (for example, a specific bit, a specific field, or a specific IE), it indicates that the QoS parameter selected by a first access network device is the second QoS parameter; or when the first indication message does not include specific information, it indicates that the QoS parameter selected by a first access network device is the first QoS parameter.

In some possible cases, a configuration on the RAN side may change. In this case, in some optional embodiments, the sending unit 501 in the access network device 50 may be further configured to send a second indication to the core network device, where the second indication is used to indicate a QoS parameter reselected by the first access network device from the first QoS parameter and the second QoS parameter. Correspondingly, the receiving unit 503 in the core network device 60 may be further configured to receive the second indication sent by the access network device 50. In this way, the core network device 60 can correspondingly adjust a QoS management policy for the related UE, the related bearer, the related PDU session, or the related data flow, to facilitate adaptive adjustment of data transmission between the UE and the core network.

In some optional embodiments, the core network may not deliver the first QoS parameter and the second QoS parameter. The sending unit 501 in the access network device 50 may be further configured to send an indication to the core network device, to indicate the configuration on the RAN side. The configuration on the RAN side includes but is not limited to one or more of the following: whether the related UE is configured with the first dual connectivity, whether the related bearer is configured as the first bearer, whether the related PDU session is configured as the first bearer, or whether the related data flow is configured as the first bearer. In this application, the indication may be referred to as a third indication. In this way, the core network device 60 can determine, based on the third indication, the QoS parameter applied to the related UE, the related bearer, the related PDU session, or the related data flow, and deliver the QoS parameter to the first access network device.

It may be understood that, for specific implementation of functional units of the access network device 50 and specific implementation of functional units of the core network device 60, refer to the foregoing method embodiments. Details are not described herein again.

The access network device 50 in the communications system 40 shown in FIG. 19 may be implemented as the master base station 101 in the wireless communications system 100 shown in FIG. 2. The core network device 60 in the communications system 40 shown in FIG. 19 may be implemented as an MME, an S-GW, or the like in an EPC, or an AMF, a UPF, an SMF, or the like in a 5GC. The access network device 50 in the communications system 40 shown in FIG. 19 may alternatively be implemented as the access network device 200 shown in FIG. 17. The core network device 60 in the communications system 40 shown in FIG. 19 may alternatively be implemented as the core network device 300 shown in FIG. 18.

In conclusion, by implementing the technical solutions provided in this application, the QoS parameter applied to the related UE, the related bearer, the related PDU session, or the related QoS flow can be effectively determined, and a board capability of the LTE base station does not need to be upgraded.

It should be further understood that first, second, and various numerical numbers in this specification are merely for differentiation for ease of description, but are not intended to limit the scope of this application.

In this application, the term "and/or" describes an association relationship between associated objects and may indicate three relationships. For example, A and/or B may indicate the following cases: Only A exists, both A and B exist, and only B exists, where A and B may be singular or plural. The character "/" usually indicates an "or" relationship between the associated objects.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate. Parts displayed as units may or may not be physical units, to be specific, may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit.

For parts between the method embodiments of this application, refer to each other. The apparatus provided in each apparatus embodiment is configured to perform the method provided in the corresponding method embodiment. Therefore, each apparatus embodiment may be understood with reference to a part in a related method embodiment.

Structural diagrams of the apparatuses provided in the apparatus embodiments of this application merely show simplified designs of the corresponding apparatuses. In actual application, the apparatus may include any quantities of transmitters, receivers, processors, memories, and the like, to implement functions or operations performed by the apparatuses in the apparatus embodiments of this application, and all apparatuses that can implement this application fall within the protections scope of this application.

Names of messages/frames/indication information, modules, units, or the like provided in the embodiments of this application are merely examples, and other names may be used provided that the messages/frames/indication information, modules, units, or the like have same functions.

A person of ordinary skill in the art may understand that all or some of the procedures of the methods in the embodiments may be implemented by a computer program instructing hardware. The program may be stored in a computer-readable storage medium. When the program runs, the procedures of the method embodiments are performed. The foregoing storage medium includes any medium that can store program code, such as a ROM, a random access memory RAM, a magnetic disk, or an optical disc.

What is claimed is:

1. A signal transmission method, comprising:
    sending, by a core network device, to a first access network device, a packet data unit (PDU) session resource setup request to establish a PDU session for a terminal device, wherein the PDU session comprises a first quality of service (QoS) flow, wherein the core network device comprises an access and mobility management function (AMF), wherein the first access network device is a new radio (NR) base station, wherein the PDU session resource setup request comprises an identifier of the first QoS flow, a first QoS parameter and a second QoS parameter, wherein an air interface rate required by the first QoS parameter is less than an air interface rate required by the second QoS parameter, wherein the first QoS parameter comprises a first guaranteed bit rate (GBR) and the second QoS parameter comprises a second GBR, and wherein the first QoS parameter and the second QoS parameter are both possible QoS parameters to be used for the first QoS flow; and
    receiving, by the core network device, a PDU session resource setup response from the first access network device, wherein the PDU session resource setup response comprises the identifier of the first QoS flow and a first indication indicating a QoS parameter selected by the first access network device from the first QoS parameter and the second QoS parameter for the first QoS flow based on an air interface rate supported by the first access network device.

2. The method according to claim 1, further comprising:
    receiving, by the core network device, a second indication from the first access network device, wherein the second indication indicates a QoS parameter reselected by the first access network device from the first QoS parameter and the second QoS parameter.

3. The method according to claim 1, wherein the QoS parameter indicated by the first indication comprises a data flow level QoS parameter.

4. The method according to claim 1, wherein each of the first QoS parameter and the second QoS parameter further comprises a respective aggregate maximum bit rate (AMBR).

5. An apparatus, comprising:
at least one processor; and
a memory coupled to the at least one processor, wherein the memory is configured to store processor-executable instructions;
wherein the at least one processor is configured to execute the processor-executable instructions to facilitate the following being performed by the apparatus:
sending, to a first access network device, a packet data unit (PDU) session resource setup request to establish a PDU session for a terminal device, wherein the PDU session comprises a first quality of service (QoS) flow, wherein the apparatus comprises an access and mobility management function (AMF), wherein the first access network device is a new radio (NR) base station, wherein the PDU session resource setup request comprises an identifier of the first QoS flow, a first QoS parameter and a second QoS parameter, wherein an air interface rate required by the first QoS parameter is less than an air interface rate required by the second QoS parameter, wherein the first QoS parameter comprises a first guaranteed bit rate (GBR) and the second QoS parameter comprises a second GBR, and wherein the first QoS parameter and the second QoS parameter are both possible QoS parameters to be used for the first QoS flow; and
receiving a PDU session resource setup response from the first access network device, wherein the PDU session resource setup response comprises the identifier of the first QoS flow and a first indication indicating a QoS parameter selected by the first access network device from the first QoS parameter and the second QoS parameter for the first QoS flow based on an air interface rate supported by the first access network device.

6. The apparatus according to claim 5, wherein the at least one processor is further configured to execute the processor-executable instructions to facilitate the following being performed by the apparatus:
receiving a second indication from the first access network device, wherein the second indication indicates a QoS parameter reselected by the first access network device from the first QoS parameter and the second QoS parameter.

7. The apparatus according to claim 5, wherein the QoS parameter indicated by the first indication comprises a data flow level QoS parameter.

8. The apparatus according to claim 5, wherein in case that an air interface transmission capability of the first access network device supports the air interface rate required by the second QoS parameter, the QoS parameter indicated by the first indication is the second QoS parameter.

9. The apparatus according to claim 5, wherein:
based on a user equipment being configured with first dual connectivity, a user equipment (UE) level QoS parameter indicated by the first indication is the second QoS parameter;

based on a bearer being configured as a first bearer, a bearer level QoS parameter indicated by the first indication is the second QoS parameter;
based on a QoS flow being configured as the first bearer, a data flow level QoS parameter indicated by the first indication is the second QoS parameter; or
based on a PDU session being configured as the first bearer, a PDU session level QoS parameter indicated by the first indication is the second QoS parameter;
wherein the first dual connectivity is associated with the first access network device and a second access network device;
wherein an air interface transmission capability of the second access network device supports the air interface rate required by the second QoS parameter; and
wherein an access network device in which a packet data convergence protocol (PDCP) anchor of the first bearer is located supports the air interface rate required by the second QoS parameter.

10. The apparatus according to claim 5, wherein an air interface transmission capability of the first access network device does not support the air interface rate required by the second QoS parameter; wherein:
based on a user equipment not being configured with first dual connectivity, a user equipment (UE) level QoS parameter indicated by the first indication is the first QoS parameter;
based on a bearer not being configured as a first bearer, a bearer level QoS parameter indicated by the first indication is the first QoS parameter;
based on a QoS flow not being configured as the first bearer, a data flow level QoS parameter indicated by the first indication is the first QoS parameter; or
based on a PDU session not being configured as the first bearer, a PDU session level QoS parameter indicated by the first indication is the first QoS parameter;
wherein the first dual connectivity is associated with the first access network device and a second access network device;
wherein an air interface transmission capability of the second access network device supports the air interface rate required by the second QoS parameter; and
wherein an access network device in which a packet data convergence protocol (PDCP) anchor of the first bearer is located supports the air interface rate required by the second QoS parameter.

11. The apparatus according to claim 5, wherein each of the first QoS parameter and the second QoS parameter further comprises a respective aggregate maximum bit rate (AMBR).

12. The method according to claim 1, wherein the QoS parameter is selected by the first access network device from the first QoS parameter and the second QoS parameter based on whether or not the first access network device is able to support the air interface rate required by the second QoS parameter, wherein the first indication indicates the second QoS parameter in case that the first access network device is able to support the air interface rate required by the second QoS parameter, and wherein the first indication indicates the first QoS parameter in case that the first access network device is not able to support the air interface rate required by the second QoS parameter.

13. The apparatus according to claim 5, wherein the QoS parameter is selected by the first access network device from the first QoS parameter and the second QoS parameter based on whether or not the first access network device is able to support the air interface rate required by the second QoS parameter, wherein the first indication indicates the second QoS parameter in case that the first access network device is able to support the air interface rate required by the second QoS parameter, and wherein the first indication indicates the first QoS parameter in case that the first access network device is not able to support the air interface rate required by the second QoS parameter.

14. An apparatus, comprising:
   at least one processor; and
   a memory coupled to the at least one processor, wherein the memory is configured to store processor-executable instructions;
      wherein the at least one processor is configured to execute the processor-executable instructions to facilitate the following being performed by the apparatus:
   receiving, from a core network device, a packet data unit (PDU) session resource setup request to establish a PDU session for a terminal device, wherein the PDU session comprises a first quality of service (QoS) flow, wherein the core network device comprises an access and mobility management function (AMF), wherein the apparatus is a new radio (NR) base station, wherein the PDU session resource setup request comprises an identifier of the first QoS flow, a first QoS parameter and a second QoS parameter, wherein an air interface rate required by the first QoS parameter is less than an air interface rate required by the second QoS parameter, wherein the first QoS parameter comprises a first guaranteed bit rate (GBR) and the second QoS parameter comprises a second GBR, and wherein the first QoS parameter and the second QoS parameter are both possible QoS parameters to be used for the first QoS flow;
   selecting a QoS parameter for the first QoS flow from the first QoS parameter and the second QoS parameter based on an air interface rate supported by the apparatus; and
   sending a PDU session resource setup response to the core network device, wherein the PDU session resource setup response comprises the identifier of the first QoS flow and a first indication indicating the selected QoS parameter.

15. The apparatus according to claim 14, wherein selecting the QoS parameter for the first QoS flow is based on whether or not the apparatus is able to support the air interface rate required by the second QoS parameter, wherein the second QoS parameter is selected in case that the apparatus is able to support the air interface rate required by the second QoS parameter, and wherein the first QoS parameter is selected in case that the apparatus is not able to support the air interface rate required by the second QoS parameter.

16. The apparatus according to claim 14, wherein the QoS parameter indicated by the first indication comprises a data flow level QoS parameter.

* * * * *